(12) United States Patent
Kawaguchi

(10) Patent No.: US 11,250,540 B2
(45) Date of Patent: Feb. 15, 2022

(54) IMAGE PROCESSING APPARATUS, IMAGE CAPTURING SYSTEM, IMAGE PROCESSING METHOD, AND RECORDING MEDIUM

(71) Applicant: Ricoh Company, Ltd., Tokyo (JP)

(72) Inventor: Keiichi Kawaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 137 days.

(21) Appl. No.: 16/728,156

(22) Filed: Dec. 27, 2019

(65) Prior Publication Data
US 2020/0211153 A1     Jul. 2, 2020

(30) Foreign Application Priority Data

Dec. 28, 2018  (JP) .............................. JP2018-247019
Dec. 23, 2019  (JP) .............................. JP2019-231625

(51) Int. Cl.
*G06T 3/00*     (2006.01)

(52) U.S. Cl.
CPC .................................. *G06T 3/0018* (2013.01)

(58) Field of Classification Search
CPC .................................................. G06T 3/0018
See application file for complete search history.

(56) References Cited

U.S. PATENT DOCUMENTS

| 2018/0181358 | A1 | 6/2018 | Asai et al. |
| 2018/0182065 | A1 | 6/2018 | Yoshida et al. |
| 2018/0184001 | A1 | 6/2018 | Yoshida et al. |
| 2018/0270417 | A1 | 9/2018 | Suitoh et al. |
| 2019/0080197 | A1 | 3/2019 | Kato |
| 2019/0124274 | A1 | 4/2019 | Naitoh et al. |
| 2019/0289203 | A1 | 9/2019 | Suitoh et al. |
| 2019/0289206 | A1 | 9/2019 | Kawaguchi et al. |
| 2019/0295216 | A1 | 9/2019 | Suitoh |
| 2019/0306175 | A1 | 10/2019 | Kato et al. |
| 2019/0306334 | A1 | 10/2019 | Katoh et al. |
| 2019/0306420 | A1 | 10/2019 | Okaki et al. |
| 2019/0340737 | A1 | 11/2019 | Kawaguchi et al. |
| 2019/0347766 | A1 | 11/2019 | Kawaguchi et al. |
| 2019/0347775 | A1 | 11/2019 | Suitoh et al. |
| 2020/0021727 | A1* | 1/2020 | Ikeda ..................... G01B 11/26 |

FOREIGN PATENT DOCUMENTS

JP     2006-340091     12/2006

OTHER PUBLICATIONS

U.S. Appl. No. 16/526,617, filed Jul. 30, 2019, Yoshinaga Kato.

* cited by examiner

*Primary Examiner* — Siamak Harandi
(74) *Attorney, Agent, or Firm* — Xsensus LLP

(57) ABSTRACT

An image processing apparatus includes circuitry to: obtain a wide-angle image, the wide-angle image being a part of or entire captured image of an object; convert the wide-angle image into a wide-angle image having a first image definition; obtain a part of the wide-angle image as a narrow-angle image; and apply projection transformation to the narrow-angle image to generate a narrow-angle image having a projection different than a projection of the wide-angle image, the narrow-angle image having a second image definition different than the first image definition of the wide-angle image.

15 Claims, 29 Drawing Sheets

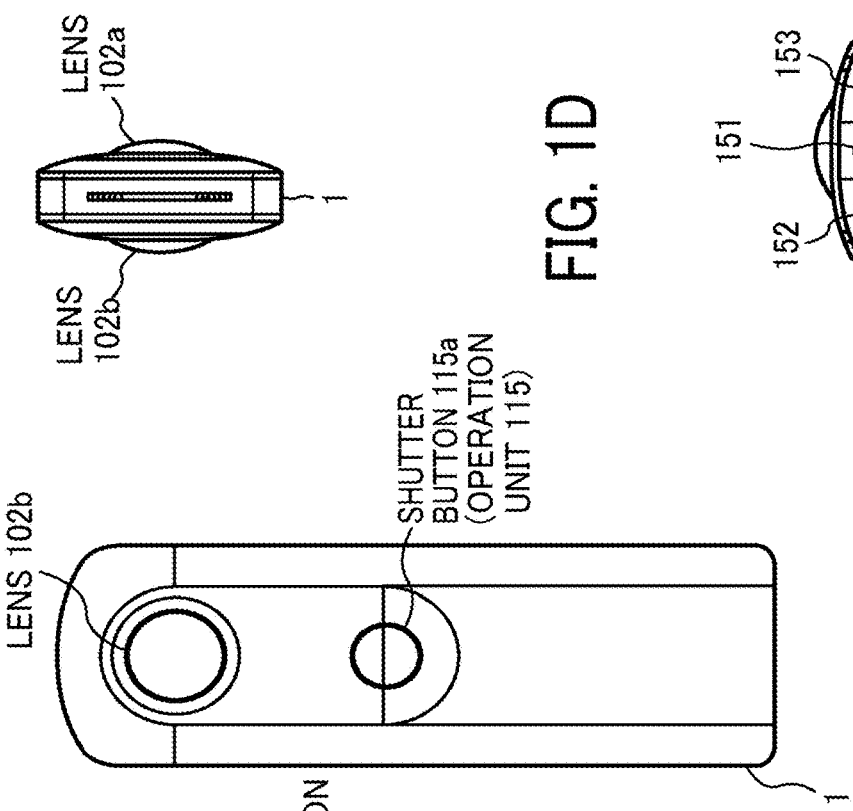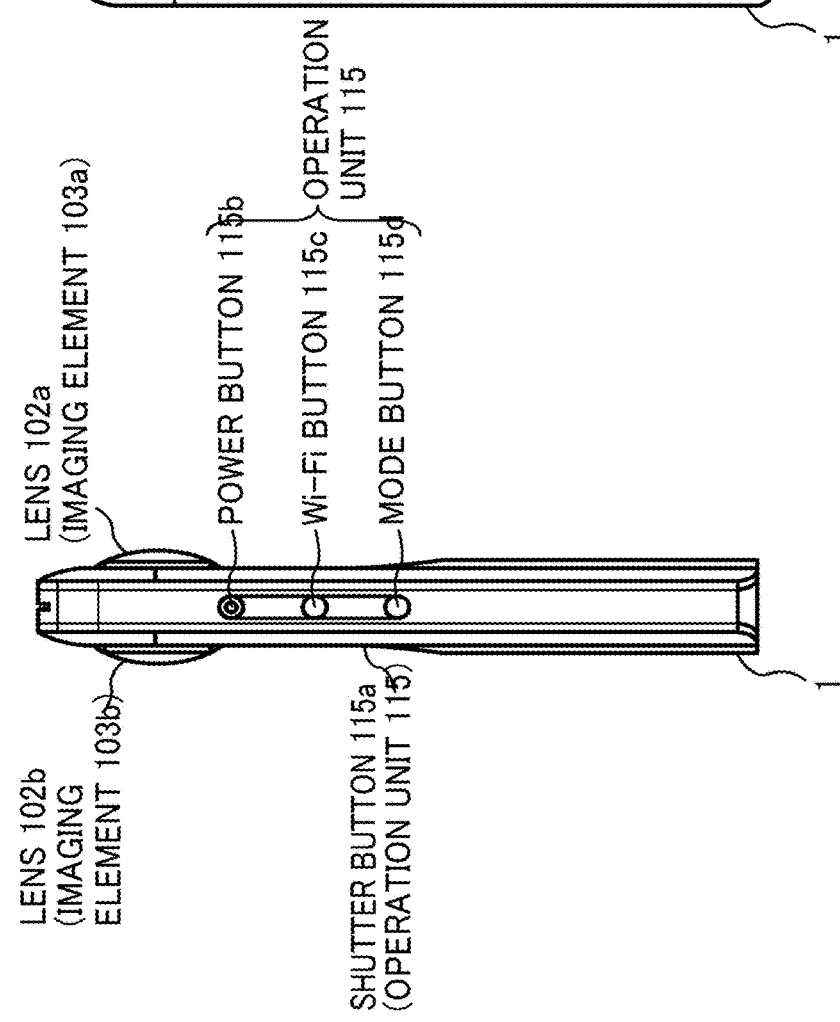

HEMISPHERICAL IMAGE (FRONT)

HEMISPHERICAL IMAGE (BACK)

CAPTURED IMAGE (EQUIRECTANGULAR PROJECTION IMAGE EC)

FIG. 4A
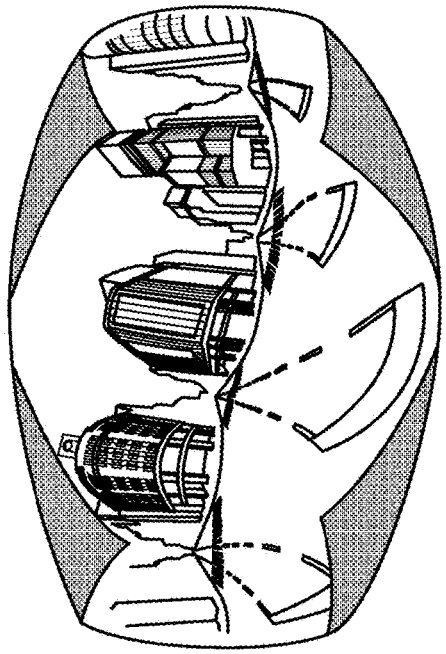
EQUIRECTANGULAR PROJECTION IMAGE EC
FIG. 4B
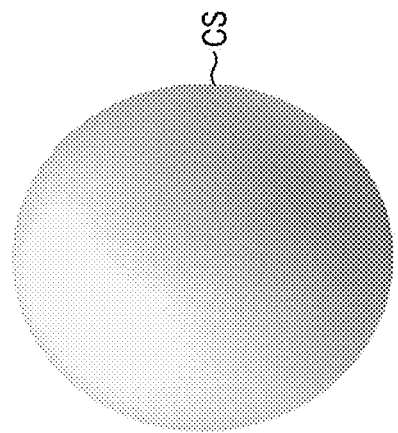
SPHERICAL IMAGE CE

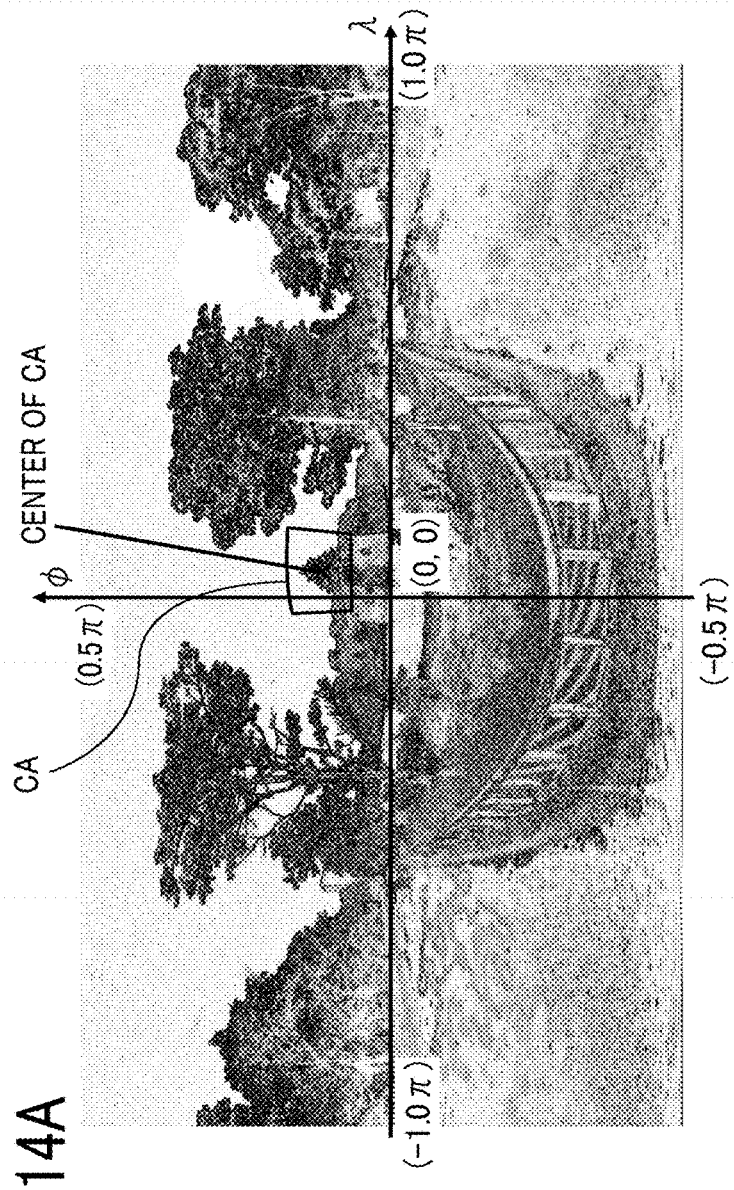
FIG. 14A
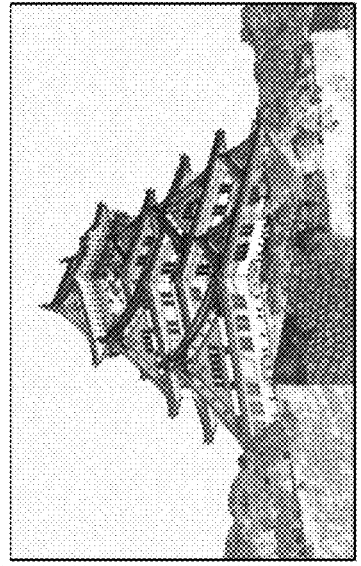
FIG. 14C
| ITEM | VALUE |
|---|---|
| POINT OF GAZE | (aa,ea) |
| ANGLE OF VIEW | α |
| ASPECT RATIO | w/h |
FIG. 14B

WHOLE IMAGE

PARTIAL IMAGE

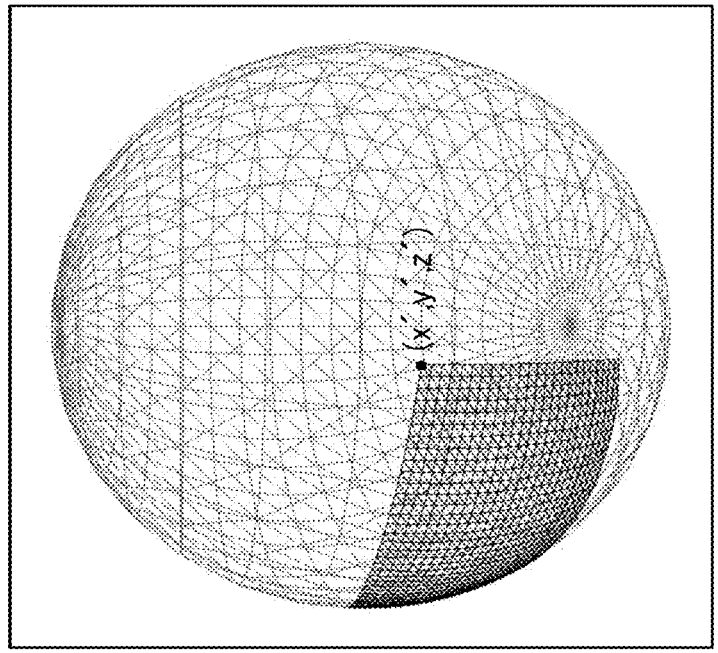
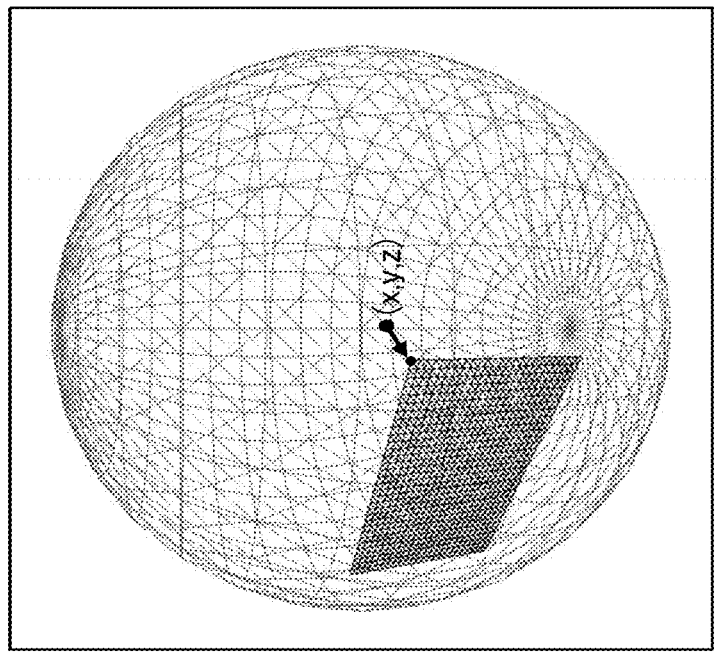

PARTIAL IMAGE P (SUPERIMPOSED IMAGE S)

PARTIAL IMAGE P (SUPERIMPOSED IMAGE S)

| | NUMBER OF HORIZONTAL PIXELS FOR HIGH-DEFINITION IMAGE | NUMBER OF VERTICAL PIXELS FOR HIGH-DEFINITION IMAGE | NUMBER OF HORIZONTAL PIXELS FOR PARTIAL IMAGE | NUMBER OF VERTICAL PIXELS FOR PARTIAL IMAGE | HORIZONTAL ANGLE OF VIEW THRESHOLD | VERTICAL ANGLE OF VIEW THRESHOLD |
|---|---|---|---|---|---|---|
| CONFIGURATION 1 | 4000 | 2000 | 1920 | 1080 | 172.8 | 97.2 |
| CONFIGURATION 2 | 4000 | 2000 | 1280 | 720 | 115.2 | 64.8 |
| CONFIGURATION 3 | 8000 | 4000 | 1920 | 1080 | 86.4 | 48.6 |
| CONFIGURATION 4 | 8000 | 4000 | 1280 | 720 | 57.6 | 32.4 |

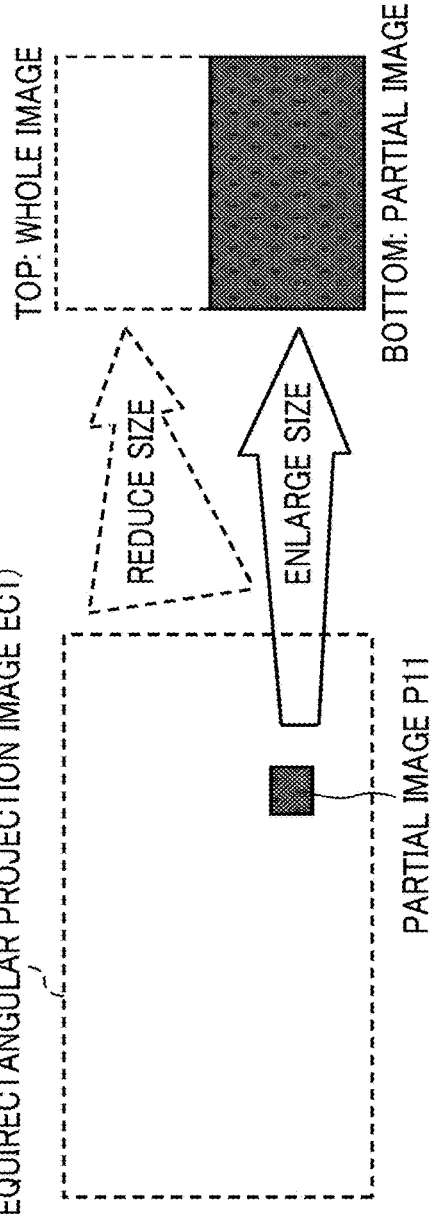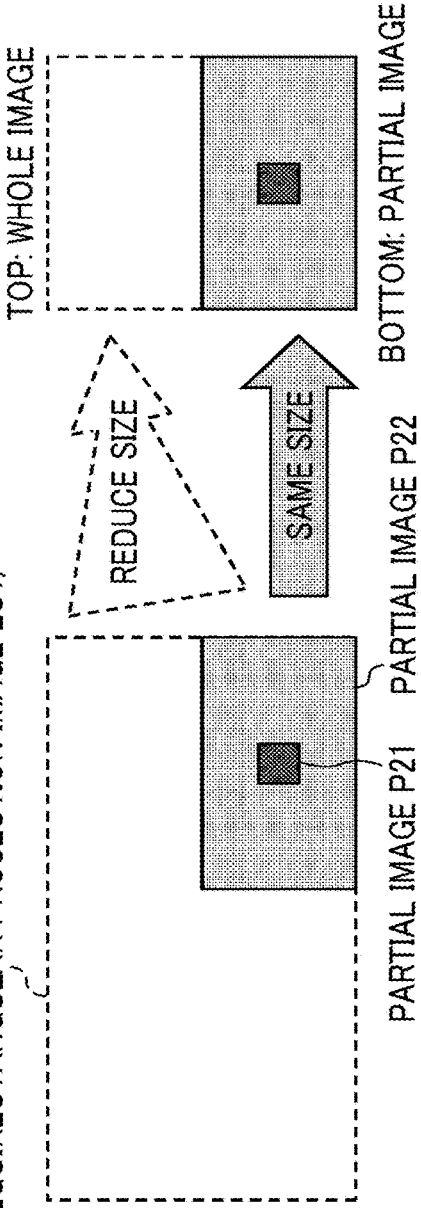

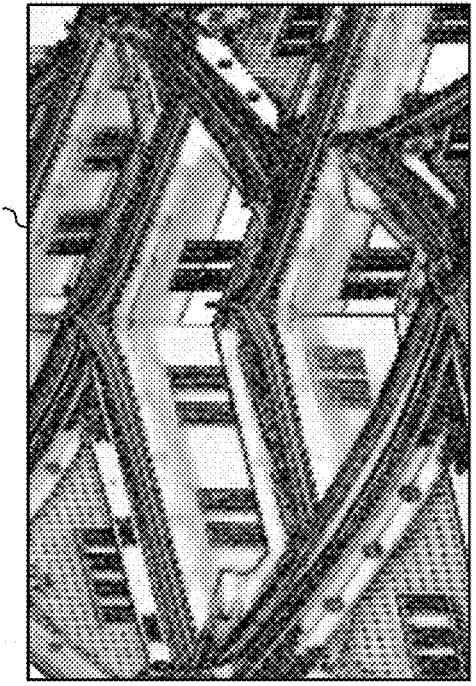
FIG. 28A VIEWABLE-AREA IMAGE Q11 (PARTIAL IMAGE P11)
FIG. 28B VIEWABLE-AREA IMAGE Q12
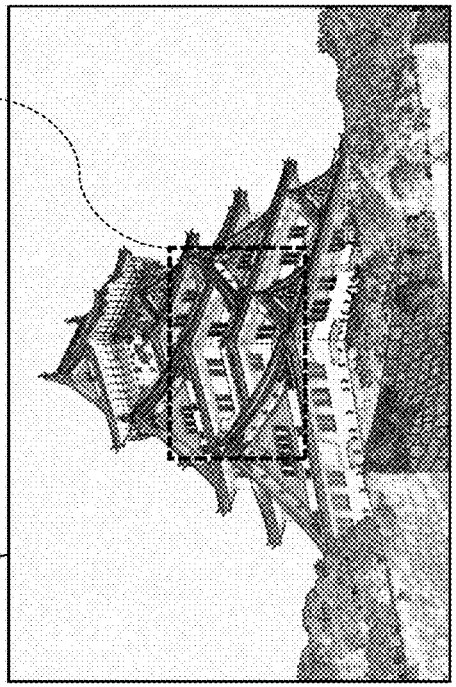
FIG. 28C VIEWABLE-AREA IMAGE Q21 (PARTIAL IMAGE P21) PARTIAL IMAGE P22
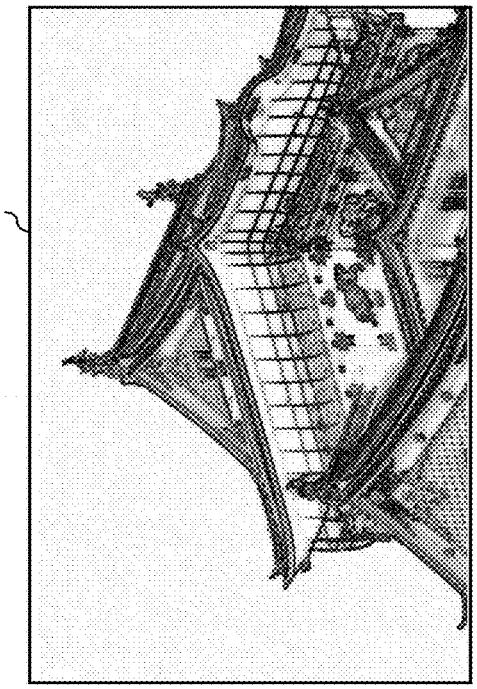
FIG. 28D VIEWABLE-AREA IMAGE Q22

IMAGE PROCESSING APPARATUS, IMAGE CAPTURING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-247019, filed on Dec. 28, 2018, and 2019-231625, filed on Dec. 23, 2019, in the Japan Patent Office, the entire disclosure of which is hereby incorporated by reference herein.

BACKGROUND

Technical Field

The present invention relates to an image processing apparatus, image capturing system, image processing method, and recording medium.

Description of the Related Art

The wide-angle view image, which is captured at an image capturing device, may be later viewed using a viewer. For example, the image capturing device is capable of transmitting the wide-angle view image to, for example, a smart phone operated by a user who views the image using the viewer. In addition to the wide-angle view image, the image capturing device may transmit a part of the wide-angle view image, which includes an area of interest, to the smart phone, usually as an image having a higher definition than that of the wide-angle of view. At the smart phone, the high-definition, partial image is superimposed on the wide-angle view image for display.

SUMMARY

Example embodiments include an image processing apparatus including circuitry to: obtain a wide-angle image, the wide-angle image being a part of or entire captured image of an object; convert the wide-angle image into a wide-angle image having a first image definition; obtain a part of the wide-angle image as a narrow-angle image; and apply projection transformation to the narrow-angle image to generate a narrow-angle image having a projection different than a projection of the wide-angle image, the narrow-angle image having a second image definition different than the first image definition of the wide-angle image.

Example embodiments include an image capturing system including the image processing apparatus.

Example embodiments include an image processing method performed by the image processing apparatus, and a control program for the image processing apparatus stored in a non-transitory recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A to 1D (FIG. 1) are respectively a right side view, a rear view, a plan view, and a bottom view of a spherical image capturing device, according to embodiments;

FIG. 4A and FIG. 4B (FIG. 4) are views respectively illustrating the image in equirectangular projection covering a surface of a sphere, and a spherical image, according to embodiments;

FIGS. 14A, 14B, and 14C (FIG. 14) are an illustration for explaining parameters of a partial image, according to the first embodiment;

FIGS. 17A and 17B (FIG. 17) are an illustration for explaining generation of a partial sphere from a partial image, according to the first embodiment;

FIG. 26A is a conceptual diagram of image data transmitted from the spherical image capturing device to the smart phone, when no processing to control size reduction is performed;

FIG. 26B is a conceptual diagram of image data transmitted from the spherical image capturing device to the smart phone, when processing to control size reduction is performed;

FIG. 28A is an illustration of an example partial image, without processing to control size reduction;

FIG. 28B is an illustration of an area of the whole image other than the partial image of FIG. 28A, without processing to control size reduction;

FIG. 28C is an illustration of an example partial image displayed as the viewable-area image, with processing to control size reduction; and FIG. 28D is an illustration of an area of the whole image other than the partial image of FIG. 28C displayed as the viewable-area image, with processing to control size reduction.

Figure 2:
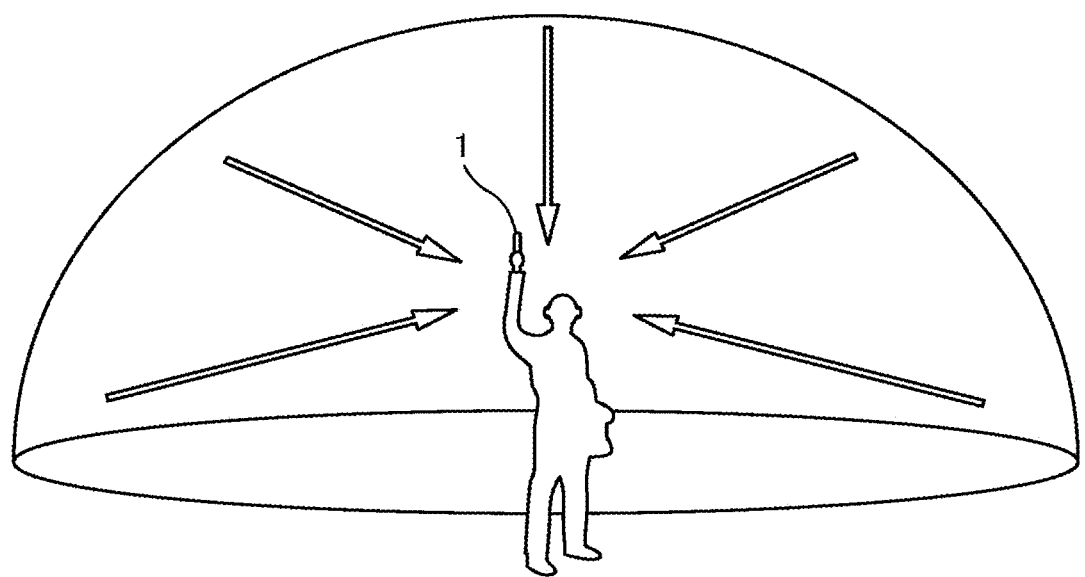
FIG. 2 is an illustration for explaining how a user uses the spherical image capturing device, according to embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described.

Referring to FIGS. 1 to 6, operation of generating a spherical image is described according to one or more embodiments.

First, referring to FIGS. 1A to 1D, an external view of a spherical image capturing device 1, is described. The spherical image capturing device 1 is a digital camera for capturing images from which a 360-degree spherical image is generated. FIGS. 1A to 1D are respectively a right side view, a rear view, a plan view, and a bottom view of the spherical image capturing device 1.

As illustrated in FIGS. 1A to 1D, the spherical image capturing device 1 has an upper part, which is provided with a fish-eye lens 102a on a front side (anterior side) thereof, and a fish-eye lens 102b on a back side (rear side) thereof. The spherical image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the spherical image capturing device 1 further includes a shutter button 115a on a rear side of the spherical image capturing device 1, which is opposite of the front side of the spherical image capturing device 1. As illustrated in FIG. 1A, the left side of the spherical image capturing device 1 is provided with a power button 115b, a Wireless Fidelity (Wi-Fi) button 115c, and an image capturing mode button 115d. Any one of the shutter button 115a, the power button 115b and the Wi-Fi button 115c switches between ON and OFF, according to selection (pressing) by the user. The image capturing mode button 115d switches between a still-image capturing mode, a moving image capturing mode, and a moving image distribution mode, according to selection (pressing) by the user. The shutter button 115a, power button 115b, Wi-Fi button 115c, and image capturing mode button 115d are an example of an operation unit 115. The operation unit 115 is any section that receives a user instruction, and is not limited to the above-described buttons or switches.

As illustrated in FIG. 1D, the spherical image capturing device 1 is provided with a tripod mount hole 151 at a center of its bottom face 150. The tripod mount hole 151 receives a screw of a tripod, when the spherical image capturing device 1 is mounted on the tripod. In this embodiment, the tripod mount hole 151 is where the general image capturing device 3 is attached via an adapter 9, described later referring to FIG. 9. The bottom face 150 of the spherical image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Next, referring to FIG. 2, a description is given of a situation where the spherical image capturing device 1 is used. FIG. 2 illustrates an example of how the user uses the spherical image capturing device 1. As illustrated in FIG. 2, for example, the spherical image capturing device 1 is used for capturing objects surrounding the user who is holding the spherical image capturing device 1 in his or her hand. The imaging elements 103a and 103b illustrated in FIGs. 1A to 1D capture the objects surrounding the user to obtain two hemispherical images.

Figure 3A:
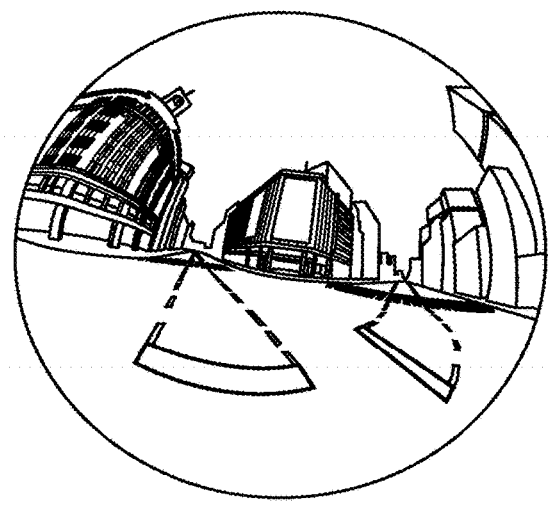
FIGS. 3A, 3B, and 3C (FIG. 3) are views illustrating a front side of a hemispherical image, a back side of the hemispherical image, and an image in equirectangular projection, respectively, captured by the spherical image capturing device, according to embodiments.
Figure 3B:
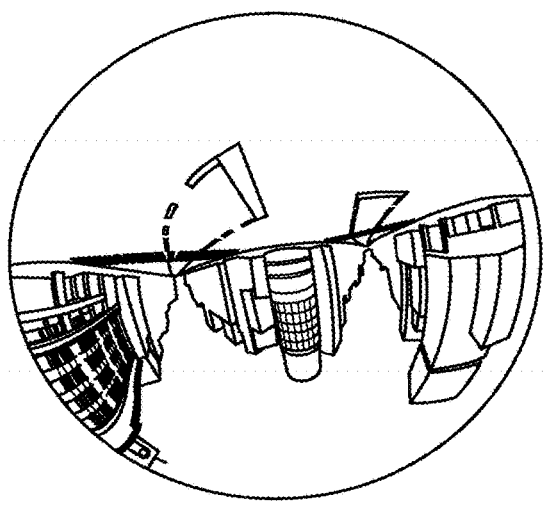
Figure 3C:
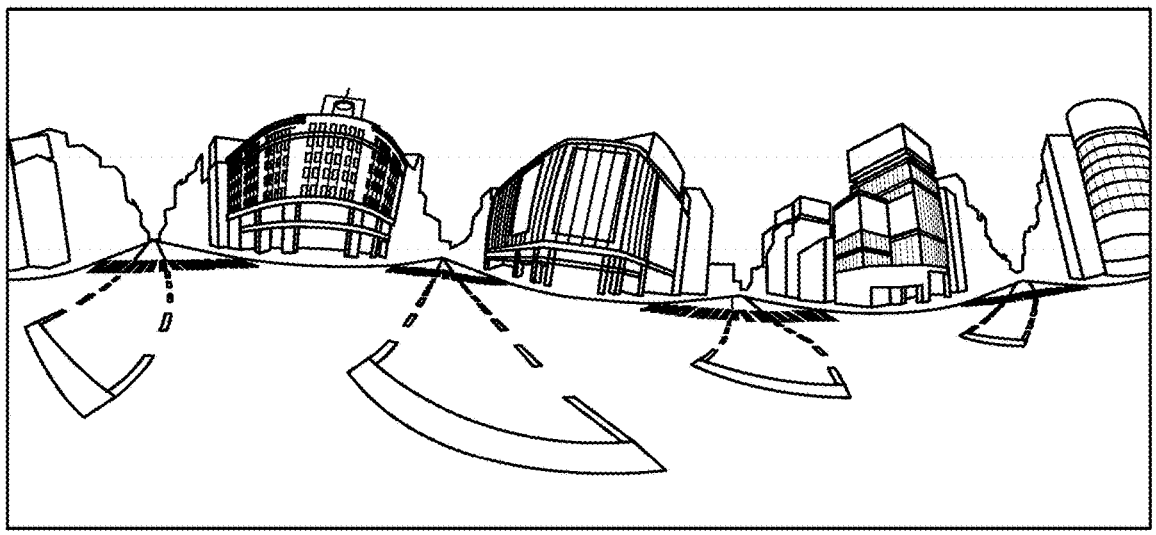

Next, referring to FIGS. 3A to 3C and FIGS. 4A and 4B, a description is given of an overview of an operation of generating an equirectangular projection image EC and a spherical image CE from the images captured by the spherical image capturing device 1. FIG. 3A is a view illustrating a hemispherical image (front side) captured by the spherical image capturing device 1. FIG. 3B is a view illustrating a hemispherical image (back side) captured by the spherical image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the spherical image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Figure 5:
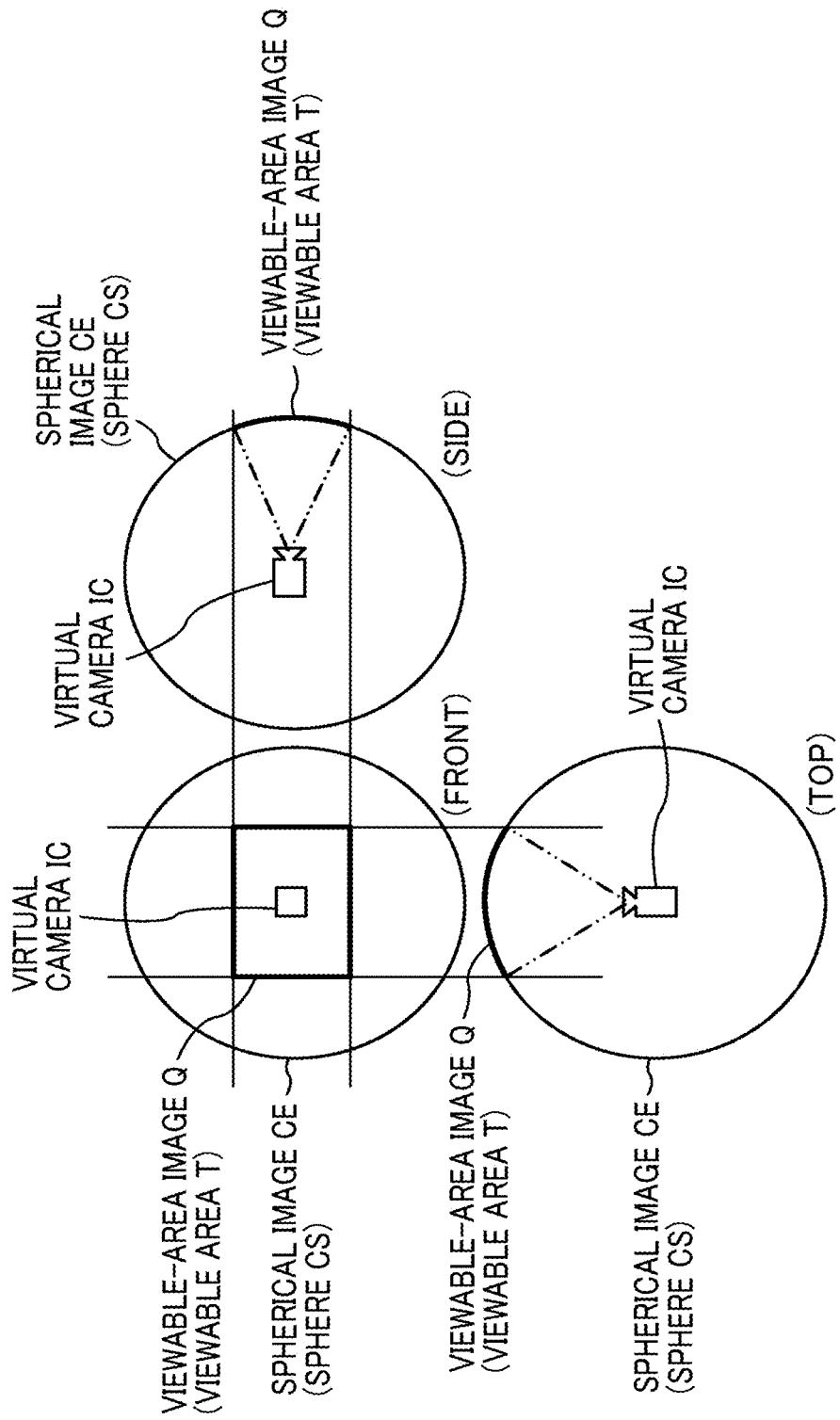
FIG. 5 is a view illustrating positions of a virtual camera and a viewable area in a case in which the spherical image is represented as a three-dimensional solid sphere according to embodiments.

Since the spherical image CE is an image attached to the sphere surface, as illustrated in FIG. 5B, a part of the image may look distorted when viewed from the user, providing a feeling of strangeness. To resolve this strange feeling, an image of a viewable area, which is a part of the spherical image CE, is displayed as a flat image having fewer curves. The viewable area is, for example, a part of the spherical image CE that is viewable by the user. In this disclosure, the image of the viewable area is referred to as a "viewable-area image" Q. Hereinafter, a description is given of displaying the viewable-area image Q with reference to FIG. 5 and FIGS. 6A and 6B.

Figure 6A:
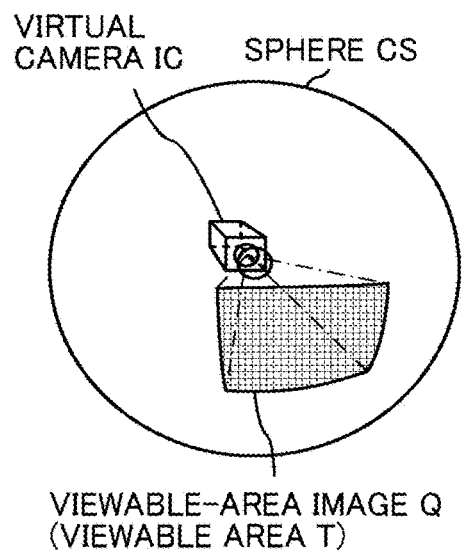
FIGS. 6A and 6B (FIG. 6) are respectively a perspective view of FIG. 5, and a view illustrating an image of the viewable area on a display, according to embodiments.
Figure 6B:
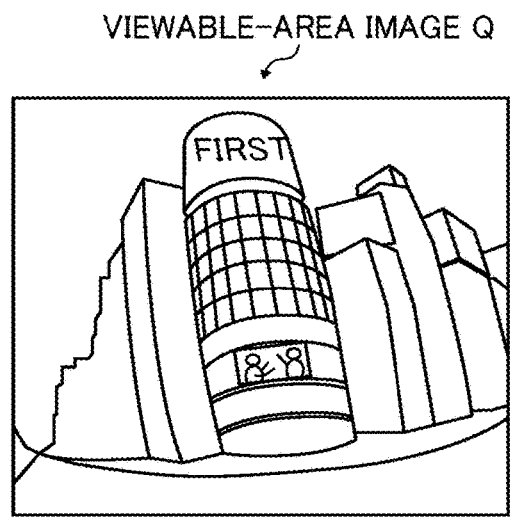

FIG. 5 is a view illustrating positions of a virtual camera IC and a viewable area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the viewable-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The viewable area T in the spherical image CE is an imaging area of the virtual camera IC. Specifically, the viewable area T is specified by viewable-area information indicating an imaging direction and an angle of view of the virtual camera IC in a three-dimensional virtual space containing the spherical image CE. That is, the zooming of the viewable area T is determined by expanding or contracting a range (arc) of the angle of view α. In addition, zooming in the viewable area T can also be determined by bringing the virtual camera IC closer to or away from the spherical image CE. The viewable-area image Q is an image of the viewable area T, in the spherical image CE.

The viewable-area image Q, which is an image of the viewable area T illustrated in FIG. 6A, is displayed on a display as an image of an imaging area of the virtual camera IC, as illustrated in FIG. 6B. FIG. 6B illustrates the viewable-area image Q represented by the viewable-area information that is set by default. The viewable-area information, which is expressed in a coordinate indicating the location of the virtual camera IC, may alternatively be expressed in an imaging area (X, Y, Z) of the virtual camera IC that corresponds to the viewable area T. In this disclosure, since the viewable area T is initially set by default, the viewable area T may be referred to as the predetermined area T (as illustrated in Figures).

Figure 7:
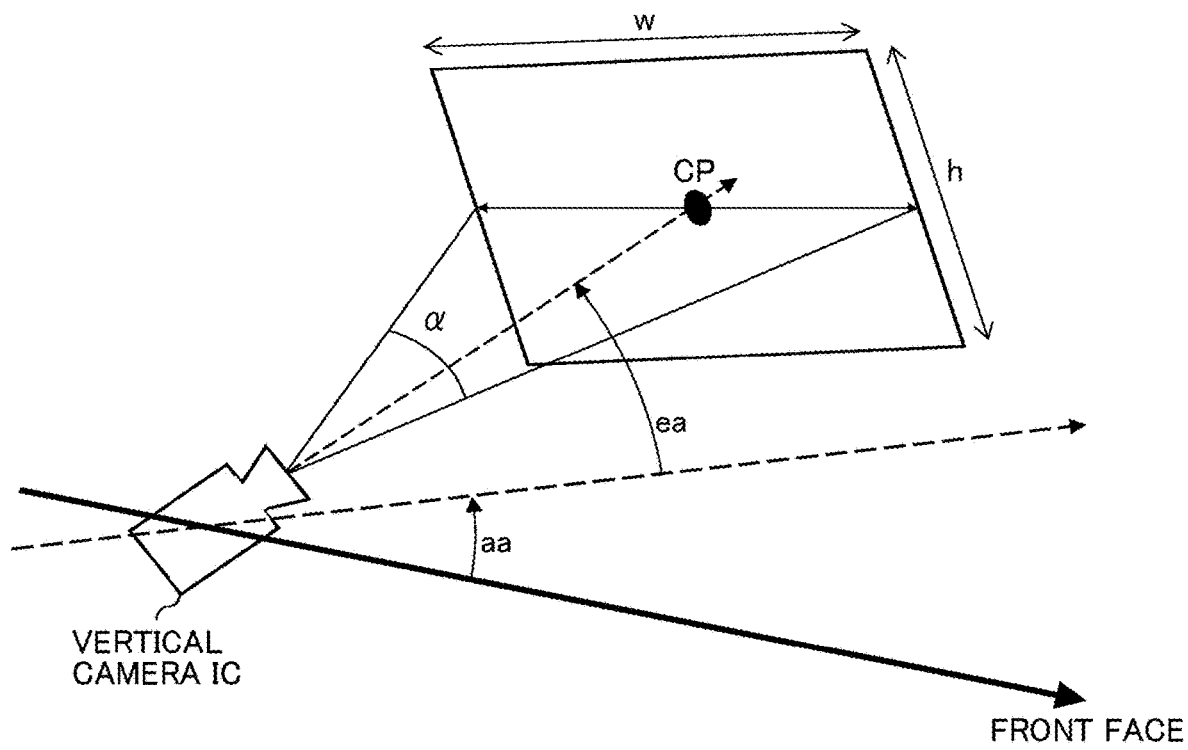
FIG. 7 is an illustration for explaining parameters of a partial image, according to embodiments.

FIG. 7 is an illustration for explaining parameters of a partial image. The following describes a method of designating a part of the spherical image, as a partial image. The coordinate of the central point CP of the partial image, in the spherical image, can be defined using an imaging direction of a camera (virtual camera IC) capturing the spherical image. Assuming that the center of the spherical image as a whole image, corresponds to a surface of the spherical image facing a viewer-side, that center has an azimuth angle "aa", and an elevation angle "ea". Further, the horizontal angle of view a can be used to represent a range (area) of the partial image. The range in the vertical and horizontal directions, can be represented by an aspect ratio (width w/height h) of the image. In alternative to using the horizontal angle of view a and the aspect ratio w/h, the range of the partial image may be represented by a diagonal angle of view and the aspect ratio w/h. In addition to the azimuth angle and the elevation angle, a rotation angle may be used.

The following describes the image capturing system according to a first embodiment.

<Overview of Image Capturing System>

Figure 8:
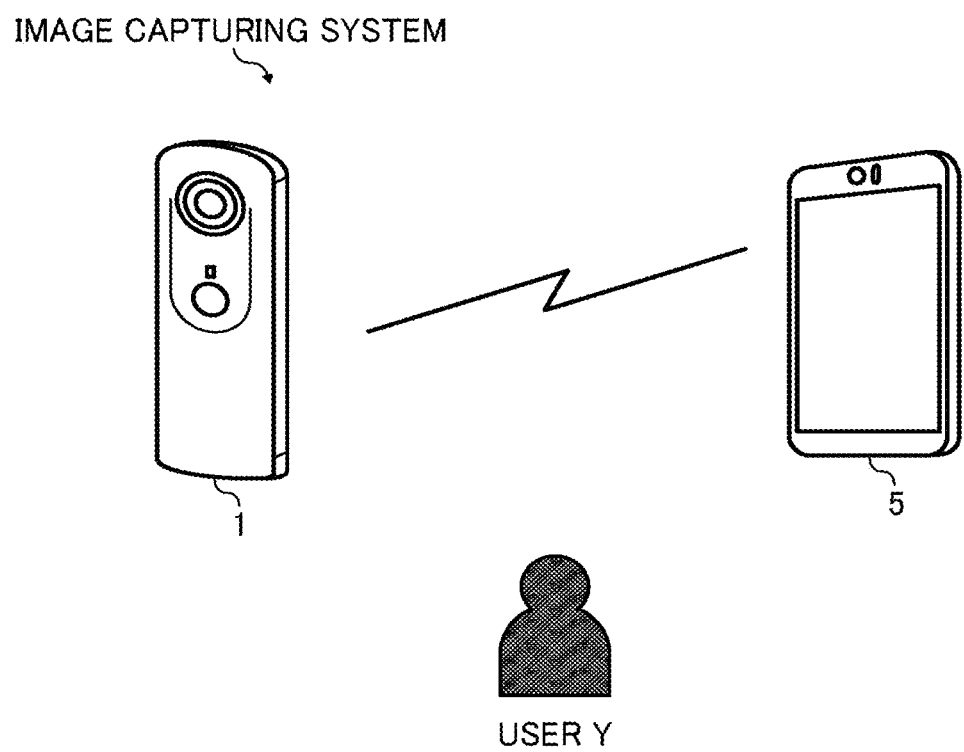
FIG. 8 is a schematic view illustrating an image capturing system according to a first embodiment.

First, referring to FIG. 8, an overview of the image capturing system is described according to the first embodiment. FIG. 8 is a schematic view illustrating the image capturing system according to a first embodiment.

As illustrated in FIG. 8, the image capturing system includes the spherical image capturing device 1, and a smart phone 5. The user Y operates both of the spherical image capturing device 1 and the smart phone 5. In such case, the user Y is a viewer, who views an image displayed at the smart phone 5.

The spherical image capturing device 1 is a special digital camera, which captures an image of an object or surroundings such as scenery to obtain two hemispherical images, from which a spherical (panoramic) image is generated, as described above referring to FIGS. 1 to 7.

The smart phone 5 is wirelessly communicable with the spherical image capturing device 1 using short-range wireless communication, such as Wi-Fi, Bluetooth (Registered Trademark), and Near Field Communication (NFC). The smart phone 5 is capable of displaying images obtained from the spherical image capturing device 1, on a display 517 provided for the smart phone 5.

The smart phone 5 may communicate with the spherical image capturing device 1, without using the short-range wireless communication, but using wired communication such as a cable.

<Hardware Configuration>

Figure 9:
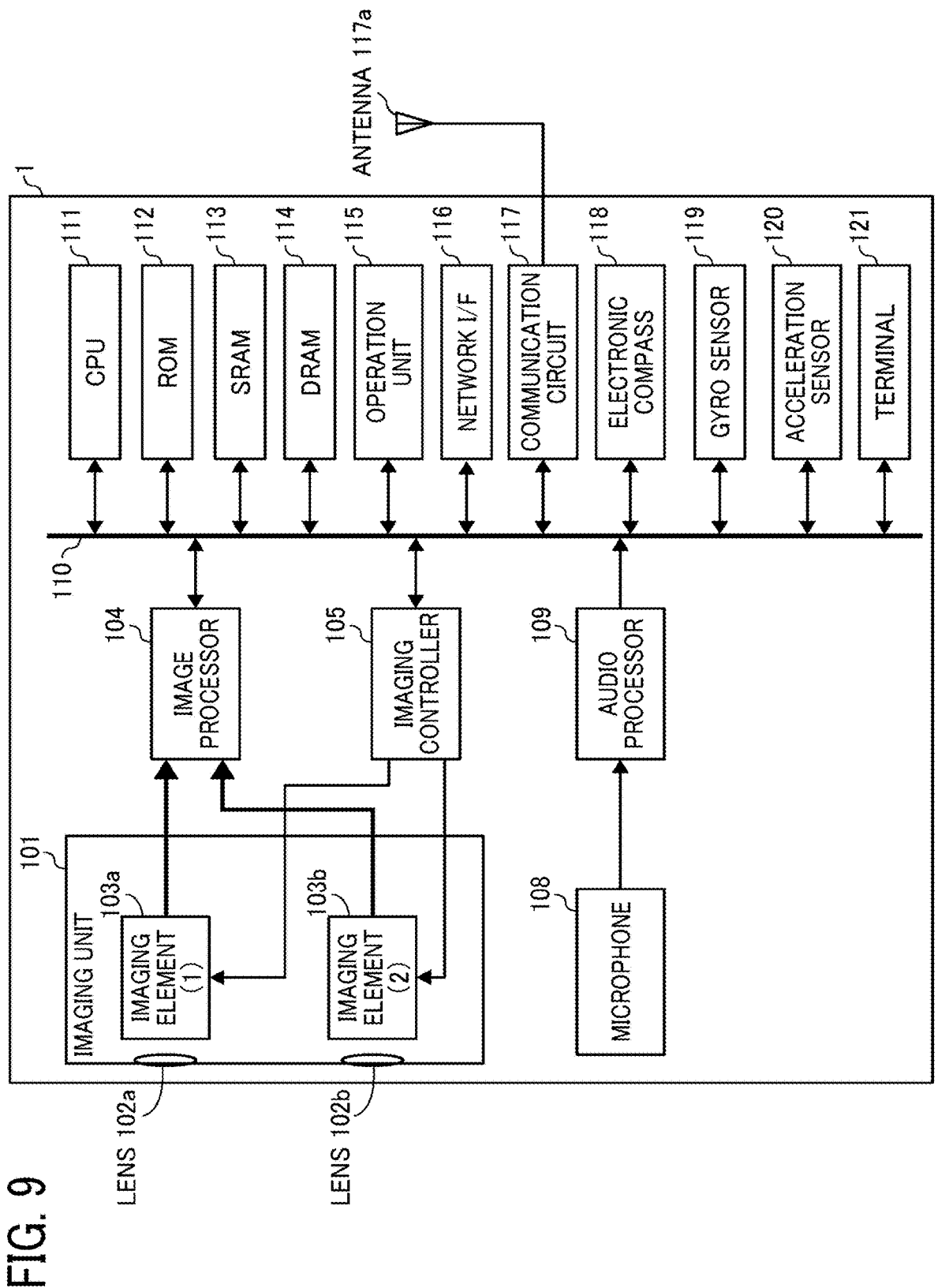
FIG. 9 is a schematic block diagram illustrating a hardware configuration of a spherical image capturing device, according to embodiments.
Figure 10:
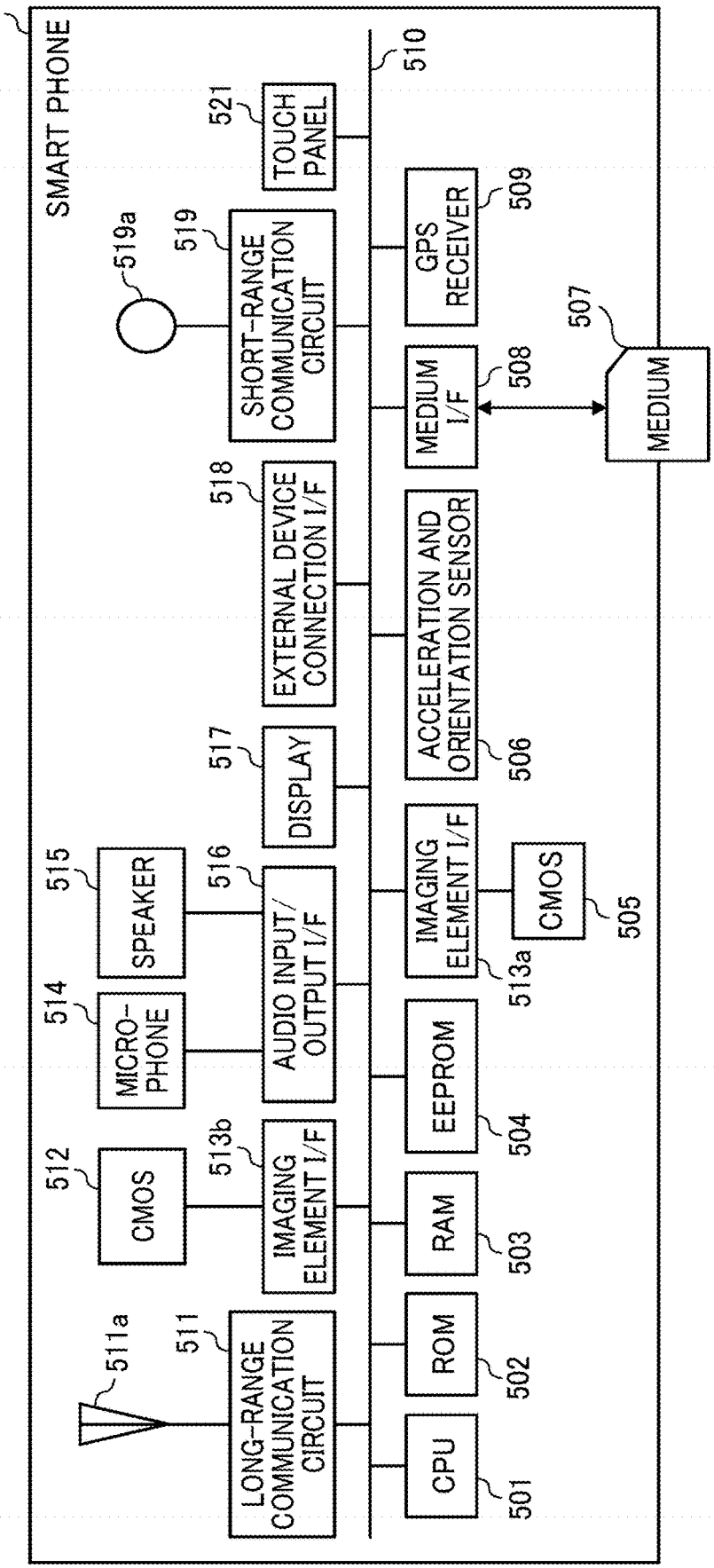
FIG. 10 is a schematic block diagram illustrating a hardware configuration of a smart phone, according to embodiments.

Next, referring to FIGS. 9 and 10, hardware configurations of the spherical image capturing device 1 and smart phone 5 are described according to the embodiment.

<Hardware Configuration of Spherical Image Capturing Device>

First, referring to FIG. 9, a hardware configuration of the spherical image capturing device 1 is described according to the embodiment. FIG. 9 is a schematic block diagram illustrating a hardware configuration of the spherical image capturing device 1. The following describes a case in which the spherical image capturing device 1 is a full-view spherical (omnidirectional) image capturing device having two imaging elements. However, the spherical image capturing device 1 may include any suitable number of imaging elements, providing that it includes at least two imaging elements. In addition, the spherical image capturing device 1 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the spherical image capturing device 1.

As illustrated in FIG. 9, the spherical image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a terminal 121.

The imaging unit 101, which may be referred to as an imaging device, includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, and the electronic compass 118 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the spherical image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per second).

Furthermore, the imaging controller 105 operates in cooperation with the CPU 111 to synchronize the time when the imaging element 103a outputs image data and the time when the imaging element 103b outputs the image data. It should be noted that, although the spherical image capturing device 1 does not include a display in this embodiment, the spherical image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the spherical image capturing device 1, for example, by performing predetermined processing. The CPU 501 may be a single or a plurality of processors. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the spherical image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the spherical image capturing device 1 by short-range wireless communication such as Wi-Fi, NFC, and Bluetooth. The communication circuit 117 is also capable of transmitting the data of equirectangular projection image to the external device such as the smart phone 5.

The electronic compass 118 calculates an orientation of the spherical image capturing device 1 from the Earth's magnetism to output orientation information. This orientation and tilt information is an example of related information, which is metadata described in compliance with Exif. This information is used for image processing such as image correction of captured images. The related information also includes a date and time when the image is captured by the spherical image capturing device 1, and a size of the image data.

The gyro sensor 119 detects the change in tilt of the spherical image capturing device 1 (roll, pitch, yaw) with movement of the spherical image capturing device 1. The change in angle is one example of related information (metadata) described in compliance with Exif. This information is used for image processing such as image correction of captured images.

The acceleration sensor 120 detects acceleration in three axial directions. The spherical image capturing device 1 calculates its position (an angle with respect to the direction of gravity), based on the acceleration detected by the acceleration sensor 120. With the gyro sensor 119 and the acceleration sensor 120, the spherical image capturing device 1 is able to correct images with high accuracy.

The terminal 121 is a connector (with a recess) for Micro USB.

<Hardware Configuration of Smart Phone>

Referring to FIG. 10, a hardware configuration of the smart phone 5 is described according to the embodiment. FIG. 10 illustrates a hardware configuration of the smart phone 5. As illustrated in FIG. 10, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The CPU 501 may be a single or a plurality of processors. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 512. The acceleration and orientation sensor 506 includes various sensors such as an electromagnetic compass or gyrocompass for detecting geomagnetism, and an acceleration sensor. The medium I/F 508 controls reading or writing of data with respect to a recording medium 507 such as a flash memory. The GPS receiver 509 receives a GPS signal from a GPS satellite.

The smart phone 5 further includes a long-range communication circuit 511, an antenna 511a for the long-range communication circuit 511, a CMOS sensor 512, an imaging element I/F 513b, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with other device through the communication network such as the Internet. The CMOS sensor 512 is an example of a built-in imaging device capable of capturing an object under control of the CPU 501. The imaging element I/F 513a is a circuit that controls driving of the CMOS sensor 512. The microphone 514 is an example of audio collecting device, which is a built-in type, capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The short-range communication circuit 519 is a communication circuit that communicates in compliance with the Wi-Fi, the NFC, the Bluetooth, and the like. The touch panel 521 is an example of input device that enables the user to input a user instruction to the smart phone 5 through touching a screen of the display 517.

The smart phone 5 further includes a bus line 510. Examples of the bus line 510 include an address bus and a data bus, which electrically connects the elements such as the CPU 501.

<Functional Configuration>

Figure 11:
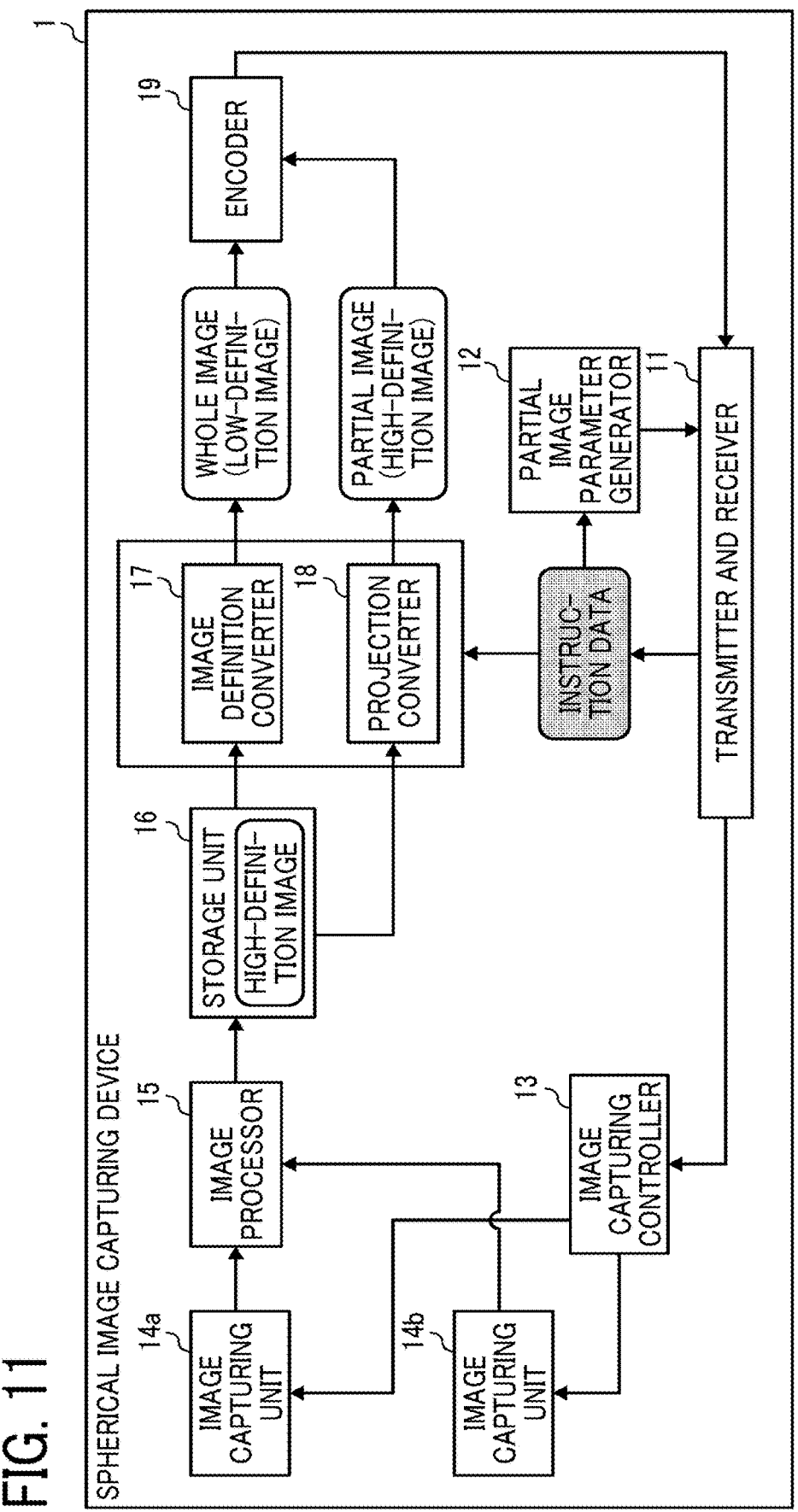
FIG. 11 is a schematic block diagram illustrating a functional configuration of the spherical image capturing system, according to the first embodiment.
Figure 12:
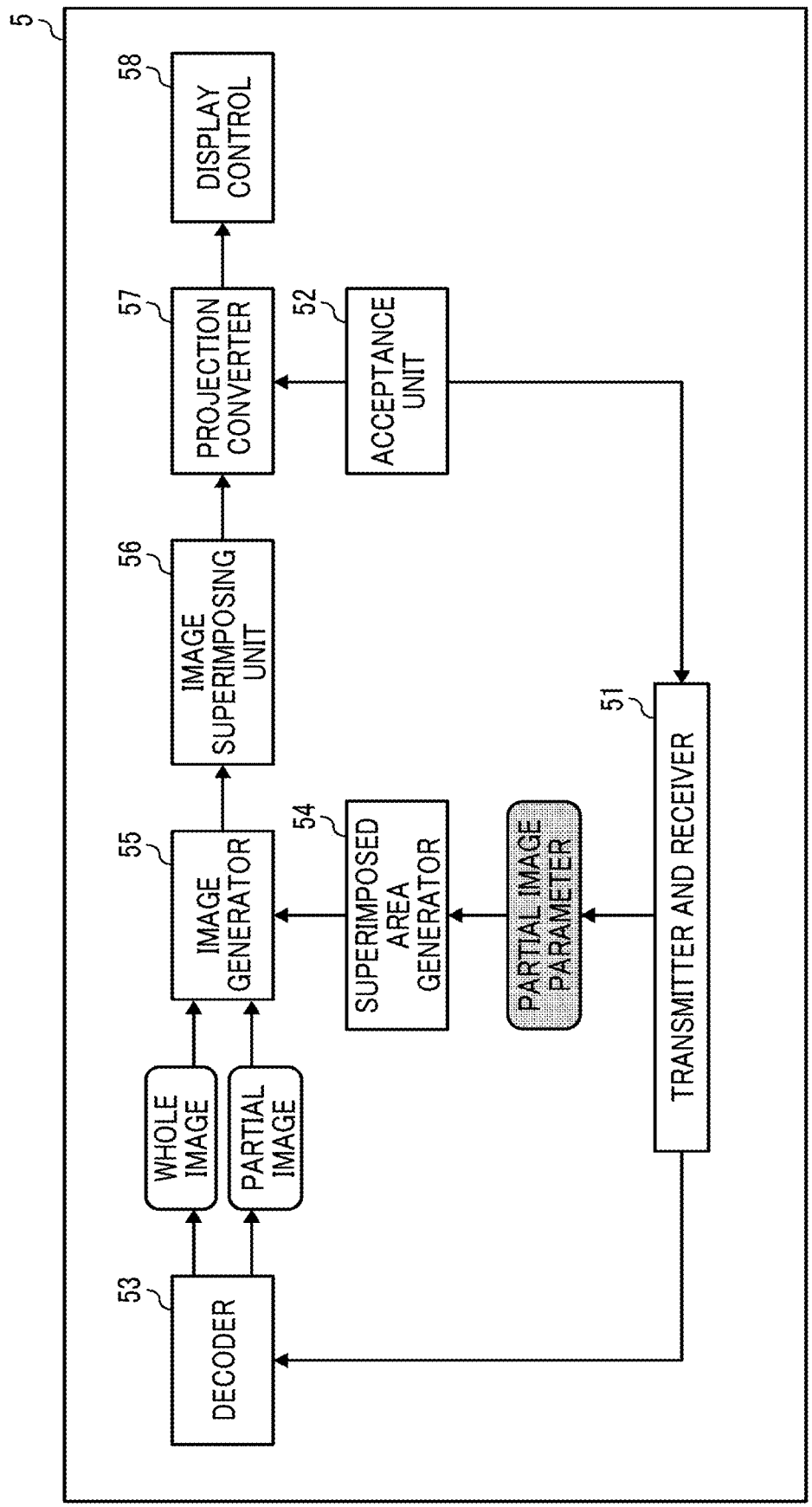
FIG. 12 is a schematic block diagram illustrating a functional configuration of the smart phone, according to the first embodiment.

Referring now to FIGS. 11 and 12, a functional configuration of the image capturing device is described according to the embodiment. FIG. 11 is a schematic block diagram illustrating a functional configuration of the spherical image capturing device according to the first embodiment. FIG. 12 is a schematic block diagram illustrating a functional configuration of the smart phone 5 according to the first embodiment.

<Functional Configuration of Spherical Image Capturing Device>

The spherical image capturing device 1 includes a transmitter and receiver 11, a partial image parameter generator 12, an image capturing controller 13, image capturing units 14a and 14b, an image processor 15, a storage unit 16, an image definition converter 17, a projection converter 18, and an encoder 19. These units are functions that are implemented by or that are caused to function by operating any of the elements illustrated in FIG. 9 in cooperation with the instructions of the CPU 111 according to the spherical image capturing device control program expanded from the SRAM 113 to the DRAM 114.

The transmitter and receiver 11 transmits or receives data to or from an extraneous source. For example, the transmitter and receiver 11 receives instruction data from the transmitter and receiver 51 of the smart phone 5, or transmits image data to the transmitter and receiver 51 of the smart phone 5 in response to the instruction data. The transmitter and receiver 11 may transmit the image data and the partial image parameters, as one data item, to the transmitter and receiver 51 of the smart phone 5. The transmitter and receiver 11 is implemented by the network I/F 116 and instructions of the CPU 111.

The partial image parameter generator 12 generates partial image parameters based on the instruction data sent from the smart phone 5 and received at the transmitter and receiver 11. The instruction data is generated according to a user operation received at the acceptance unit 52 of the smart phone 5, and is an instruction for specifying an area to be viewed, which is a part of the whole image. The area to be viewed corresponds to an area CA, which is to be cut out from the whole image at the spherical image capturing device 1, as the partial image. The partial image parameters are used to specify a superimposed area, which is an area on which the partial image (the superimposed image S) is to be superimposed on the spherical image CE (whole image), when displayed at the smart phone 5. The partial image parameter generator 12 is implemented by instructions of the CPU 111.

The image capturing controller 13 outputs an instruction to each of the image capturing units 14a and 14b, to synchronize timings at which the image data are output from the image capturing units 14a and 14b. The image capturing controller 13 is implemented by the instructions of the CPU 111, which operates with the imaging controller 105.

The image capturing units 14a and 14b respectively capture an object according to instructions from the image capturing controller 13, to output data of hemispherical images, from which the spherical image is generated, as illustrated in FIGS. 3A and 3B. The image capturing units 14a and 14b correspond to the imaging elements 103a and the lens 102a, and the imaging element 103b and the lens 102b, respectively.

The image processor 15 synthesizes and converts data of two hemispherical images obtained by the image capturing units 14a and 14b into data of an equirectangular projection image in equirectangular projection. The image processor 15 corresponds to the image processor 104, which is implemented by an image processing circuit.

The storage unit 16 serves as a buffer for temporarily storing data of the equirectangular projection image synthesized and converted by the image processor 15. The equirectangular projection image, at this stage, is a high-definition image, as the image is generated by combining the images captured at the image capturing units 14a and 14b. The storage unit 16 may be implemented by a RAM.

The image definition converter 17 converts the equirectangular projection image from a high-definition image to a low-definition image, for example, by reducing an image size according to instruction data from the smart phone 5 received at the transmitter and receiver 11. Accordingly, the low-definition, equirectangular projection image (whole image) is generated. The image definition converter 17 may be implemented by instructions of the CPU 111.

Figure 15:
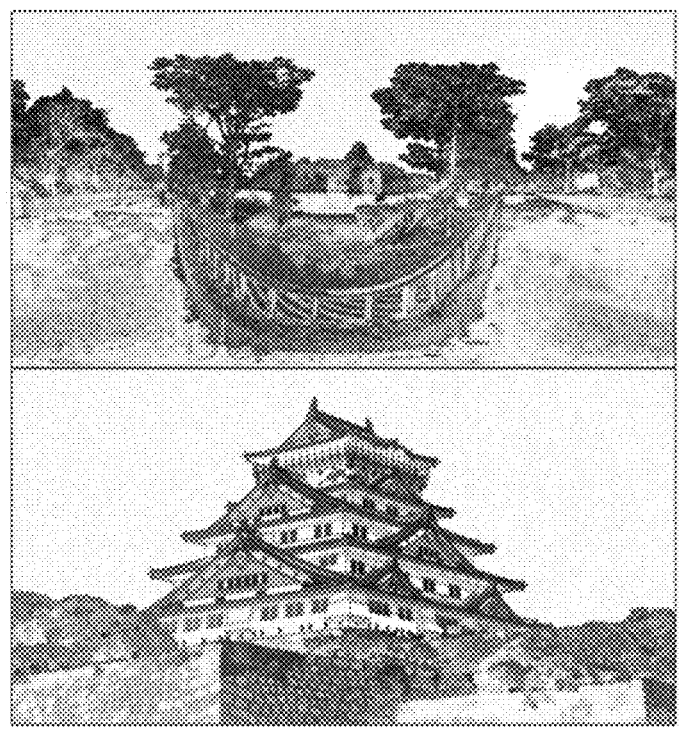
FIG. 15 is a conceptual diagram of image data to be transmitted from the spherical image capturing device to the smart phone, according to the first embodiment.

The projection converter 18 applies projection transformation to a part of the equirectangular projection image, to convert from the equirectangular projection to the perspective projection, according to the instruction data received at the transmitter and receiver 11. The instruction data indicates an imaging direction, angle of view, and aspect ratio of a partial image (a part of the whole image), and an image size for data transmission (See FIG. 15). Accordingly, the high-definition, partial image is generated. In FIG. 15, the aspect ratio of the whole image is 16:9, and the aspect ratio of the partial image is 16:9. The aspect ratio of image data including the whole image and the partial image for transmission becomes 16:18. As described above, the whole image data output from the image definition converter 17 has a lower definition (or resolution) than that of the partial image data output from the projection converter 18. That is, the partial image data output from the projection converter 18 has a higher definition (resolution) than that of the whole image data output from the image definition converter 17. The projection converter 18 is implemented by the instructions of the CPU 111.

The encoder 19 encodes each data of the whole image and the partial image, and temporarily stores the encoded image data in any memory. The whole image and the partial image are associated, for example, as described referring to FIG. 15. The encoder 19 is implemented by the instructions of the CPU 111.

For the descriptive purposes, the example case in which an equirectangular projection image of 2K, 4K, or 8K is generated as a high-definition image is described. The projection converter 18 applies projection transformation to a part of the high-definition, equirectangular projection image, for example, from equirectangular projection to perspective projection, to generate a partial image in perspective projection. This partial image is a high-definition image, as image definition is kept the same at 2K, 4K, or 8K.

The image definition converter 17 converts, from the high-definition, equirectangular projection image, to generate a low-definition, equirectangular projection image (that is, low-definition, whole image). For example, the low-definition image of 1K, 2K, or 4K is generated from the high-definition image of 2K, 4K, or 8K. In this disclosure, the low-definition image is any image having a lower resolution than that of an original image that has been generated as a result of capturing.

<Functional Configuration of Smart Phone>

Referring to FIG. 12, the smart phone 5 includes a transmitter and receiver 51, an acceptance unit 52, a decoder 53, a superimposed area generator 54, an image generator 55, an image superimposing unit 56, a projection converter 57, and a display control 58. These units are functions that are implemented by or that are caused to function by operating any of the hardware elements illustrated in FIG. 10 in cooperation with the instructions of the CPU 501 according to the control program for the smart phone 5, expanded from the EEPROM 504 to the RAM 503.

<Functional Configuration of Smart Phone>

Referring to FIG. 12, a functional configuration of the smart phone 5 is described in detail.

The transmitter and receiver 51 transmits or receives data to or from an extraneous source. For example, the transmitter and receiver 51 transmits instruction data to the transmitter and receiver 11 of the spherical image capturing device 1, and receives image data from the transmitter and receiver 11 of the spherical image capturing device 1 in response to the instruction data. The transmitter and receiver 51 may divide the image data and the partial image parameters into different data, when the image data and the partial image parameters are received as one data item from the transmitter and receiver 11 of the spherical image capturing device 1. The transmitter and receiver 51 may be implemented by the short-range communication circuit 519 or the long-range communication circuit 511, which operates under control of the CPU 501.

The acceptance unit 52 accepts a user operation for designating the imaging direction, the angle of view, and the aspect of the partial image, and the size of the image data to be received by the smart phone 5. The acceptance unit 52 generates instruction data based on the user operation, which is to be transmitted to the spherical image capturing device 1. The acceptance unit 52 is implemented by the touch panel 521, and the instructions of the CPU 501. The microphone 514 may be used, in case the user operation is received as voice.

The decoder 53 decodes each data of the whole image and the partial image encoded by the encoder 19. The decoder 53 may be implemented by the instructions of the CPU 501.

The superimposed area generator 54 specifies a superimposed area as indicated by the partial image parameters. The superimposed area indicates a location and a range of an area of the spherical image CE, on which a superimposed image S and a mask image M are superimposed.

The image generator 55 generates the superimposed image S and the mask image M, which is to be superimposed on the superimposed area, and generates a spherical image CE from the low-definition, whole image.

The image superimposing unit 56 superimposes the superimposed image S and the mask image M, on the superimposed area of the spherical image CE, to generate the spherical image CE.

The projection converter 57 converts projection of the spherical image CE, from equirectangular projection to perspective projection, according to instruction data generated based on a user operation received at the acceptance unit 52. The projection converter 57 is implemented by the instructions of the CPU 501.

The display control 58 controls the display 517 to display the viewable-area image Q of the spherical image CE that is converted to have a perspective projection. The display control 58 is implemented by the instructions of the CPU 501, which controls operation of the display 517.

<Operation>

Referring now to FIGS. 13 to 20, operation of capturing the image and displaying the image, performed by the image capturing system, is described according to the first embodiment.

<Processing of Spherical Image Capturing Device>

Figure 13:
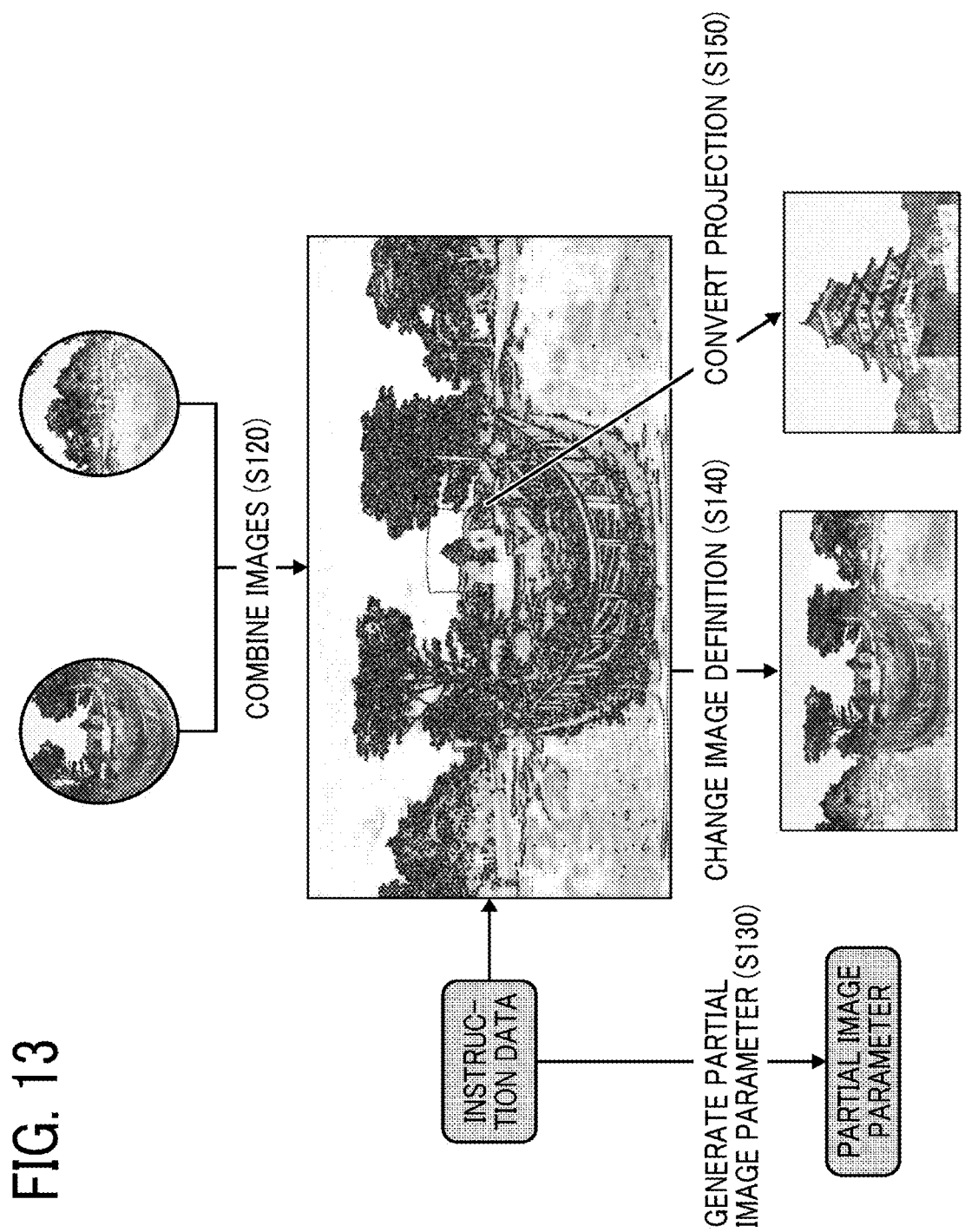
FIG. 13 is a conceptual diagram for illustrating image processing performed by the spherical image capturing device, and images generated along with processing, according to the first embodiment.

First, referring to FIG. 13, processing of the spherical image capturing device 1 is described according to the embodiment. FIG. 13 is a conceptual diagram for illustrating image processing performed by the spherical image capturing device 1, and images generated along with processing, according to the first embodiment.

The image processor 15 combines (stiches) data of two hemispherical images obtained by the image capturing units 14a and 14b into data of an equirectangular projection image in equirectangular projection (S120). The data of equirectangular projection image, which is a high-definition image, is temporarily stored in the storage unit 16.

The partial image parameter generator 12 generates partial image parameters based on the instruction data sent from the smart phone 5 (S130). As described above, the instruction data includes information on an imaging direction, angle of view, and aspect ratio of a partial image (a part of the whole image), and an image size for data transmission. As described below, the partial image parameters specify an area of the equirectangular projection image, on which the partial image is to be superimposed. The partial image parameters are generated based on the imaging direction and the angle of view, for example.

The image definition converter 17 converts the equirectangular projection image from a high-definition image to a low-definition image, according to instruction data from the smart phone 5 received at the transmitter and receiver 11 (S140). Specifically, the image definition converter 17 reduces a size of the equirectangular projection image according to a size of image data to be transmitted to the smart phone 5, as instructed by the instruction data. Accordingly, the low-definition, equirectangular projection image (whole image) is generated.

The projection converter 18 applies projection transformation to an area of the equirectangular projection image, which corresponds to the partial image, to convert from the equirectangular projection to the perspective projection, according to the instruction data received at the transmitter and receiver 11 (S150). Accordingly, the high-definition, partial image is generated. The transmitter and receiver 11 transmits the whole image data and the partial image data, encoded by the encoder 19, to the transmitter and receiver 51 of the smart phone 5.

Referring to FIGS. 14 and 15, the above-described processing of FIG. 13 is described in detail. FIG. 14 is an illustration for explaining parameters of a partial image.

(Partial Image Parameters)

Referring to FIG. 14, partial image parameters are described in detail. FIG. 14A illustrates the whole image, which is the equirectangular projection image, obtained as a result of the images being combined at S120. FIG. 14A further illustrates an area CA, which is to be cut out as a partial image, from the whole image. FIG. 14B is a diagram illustrating an example of partial image parameters. FIG. 14C illustrates the partial image, to which the projection transformation is applied at S150.

The azimuth angle (aa) in FIG. 7 corresponds to the horizontal direction (longitude λ) in the equirectangular projection image illustrated in FIG. 14A. The elevation angle (ea) in FIG. 7 corresponds to the vertical direction (latitude φ) in the equirectangular projection image illustrated in FIG. 14A. The partial image parameters define an area CA in the equirectangular projection image, as the partial image. Specifically, as illustrated in FIG. 14B and FIG. 7, the partial image parameters include the point of gaze (aa, ea) as the central point CP, the angle of view α, and the aspect ratio of the horizontal length (w) and vertical length (h). With the partial image parameters, a specific area CA in the equirectangular projection image as the partial image can be defined. FIG. 14C illustrates an example partial image obtained by cutting out an area CA, surrounded by a frame in the equirectangular projection image in FIG. 14A that is defined by the partial image parameters.

The following describes transformation of a projection in detail. As illustrated in FIG. 4A, the equirectangular projection image EC covers a surface of the sphere CS, to generate the spherical image CE illustrated in FIG. 4B. Therefore, each pixel in the equirectangular projection image EC corresponds to each pixel in the surface of the sphere CS, that is, the three-dimensional, spherical image. The projection converter 57 applies the following transformation equation 1. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)), \quad \text{(Equation 1)}$$

wherein the sphere CS has a radius of 1.

The partial image in perspective projection, is a two-dimensional image. When the partial image is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The partial image, which is represented by the two-dimensional rectangular coordinate system (u, v), can be expressed using the polar coordinate system (moving radius, argument)=(r, a) using the following conversion equation 2.

$$u=r\times\cos(a), v=r\times\sin(a) \quad \text{(Equation 2)}$$

The equation 2 is represented by the three-dimensional coordinate system (moving radius, polar angle, azimuth).

For the surface of the sphere CS, the moving radius in the three-dimensional coordinate system is "1". The equirectangular projection image, which covers the surface of the sphere CS, is converted from the equirectangular projection to the perspective projection, using the following equations 3 and 4. Here, the equirectangular projection image is represented by the above-described two-dimensional polar coordinate system (moving radius, argument)=(r, a), and the virtual camera IC is located at the center of the sphere.

$$r = \tan(\text{polar angle}) \quad \text{(Equation 3)}$$

$$a = \text{azimuth} \quad \text{(Equation 4)}$$

Assuming that the polar angle is t, Equation 3 can be expressed as: $t=\arctan(r)$. Accordingly, the three-dimensional polar coordinate (moving radius, polar angle, azimuth) is expressed as $(1, \arctan(r), a)$.

The three-dimensional polar coordinate system is transformed into the rectangle coordinate system (x, y, z), using Equation 5.

$$(x,y,z) = (\sin(t) \times \cos(a), \sin(t) \times \sin(a), \cos(t)) \quad \text{(Equation 5)}$$

Equation 5 is applied to convert between the equirectangular projection image EC (whole image) in equirectangular projection, and the partial image in perspective projection. More specifically, the moving radius r, which corresponds to the diagonal angle of view α of the partial image, is used to calculate transformation map coordinates, which indicate correspondence of a location of each pixel between the partial image and the equirectangular projection image EC. With this transformation map coordinates, the equirectangular projection image EC is transformed to generate the partial image in perspective projection.

Through the above-described projection transformation, the coordinate (latitude=90°, longitude=0°) in the equirectangular projection image EC becomes the central point in the partial image in perspective projection. In case of applying projection conversion to an arbitrary point in the equirectangular projection image EC as the point of gaze, the sphere CS covered with the equirectangular projection image EC is rotated such that the coordinate (latitude, longitude) of the point of gaze is positioned at (90°, 0°).

The sphere CS may be rotated using any known equation for rotating the coordinate.

(Image Data to be Transmitted)

Next, referring to FIG. 15, image data to be transmitted from the spherical image capturing device 1 to the smart phone 5 is described in detail. FIG. 15 is a conceptual diagram of image data to be transmitted from the spherical image capturing device 1 to the smart phone 5. As illustrated in FIG. 15, according to a predetermined image size for transmission, the whole image and the partial image are associated such that, when displayed, the whole image is positioned at top, and the partial image is positioned at bottom. The whole image and the partial image having been associated with each other may be stored in the SRAM 113 or DRAM 114, before transmission. In this embodiment, the images are arranged to have an aspect ratio of 16:9, which is generally used for high-definition (HD) TV, but any other aspect ratio may be used. Further, the arrangement of these two images is not limited to the upper and lower sides, but may be left and right sides. When there is a plurality of partial images, the whole image and the partial images are associated, such that the whole image may be positioned at upper half, and the partial images may be positioned at lower half, while the lower half area being divided into areas in a number of partial images. By transmitting the whole image and the partial image(s) as one item of data, it would be easier to manage images to be combined (stitched), or images to be synchronized for display at substantially the same time. Alternatively, the spherical image capturing device 1 may transmit the whole image data and the partial image data to the smart phone 5 separately, or at different timings, as long as they are associated to be displayed as one image.

<Operation and Processing of Smart Phone>

Figure 16:
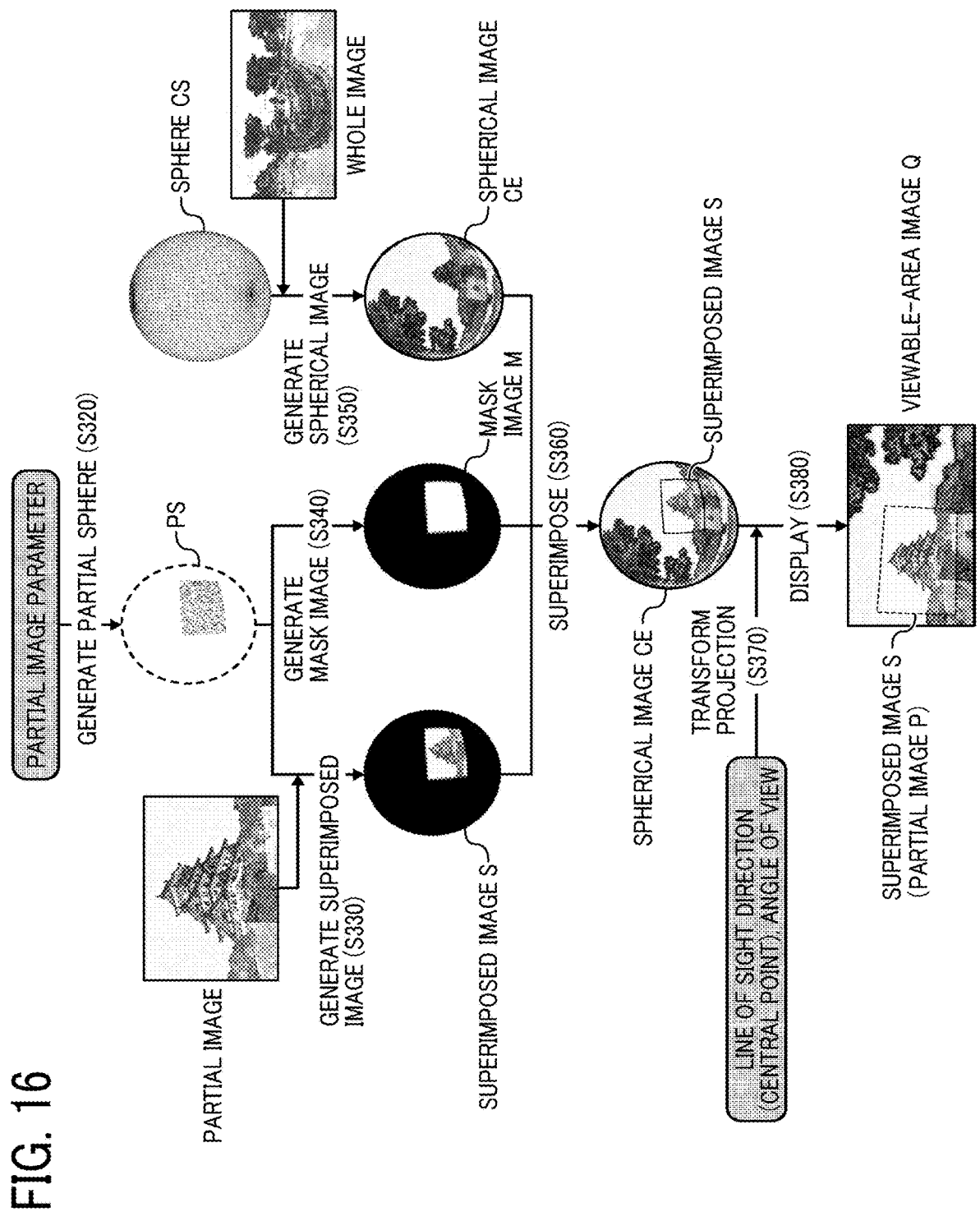
FIG. 16 is a conceptual diagram for illustrating image processing performed by the smart phone, and images generated along with processing, according to the first embodiment.

Referring to FIG. 16, processing of the smart phone 5 is described according to the embodiment. FIG. 16 is a conceptual diagram for illustrating image processing performed by the smart phone 5, and images generated along with processing, according to the first embodiment.

The superimposed area generator 54 illustrated in FIG. 12 generates a partial sphere PS, indicated by partial image parameters, as illustrated in FIG. 16 (S320).

The image generator 55 superimposes the partial image in perspective projection, on the partial sphere PS to generate the superimposed image S (S330). The image generator 55 further generates the mask image M, based on a surface area of the partial sphere PS (S340). The image generator 55 covers (attaches) the whole image in equirectangular projection (equirectangular projection image EC), over the sphere CS, to generate the spherical image CE (S350). The image superimposing unit 56 superimposes the superimposed image S and the mask image M, on the spherical image CE (S360). The image is generated, in which the high-definition superimposed image S is superimposed on the low-definition spherical image CE. With the mask image, the boundary between the two different images is made unnoticeable.

The projection converter 57 converts projection (S370), such that the viewable area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the viewable area T), and the angle of view α of the viewable area T. Accordingly, the display control 58 controls the display 517 to display the viewable-area image Q, which is a viewable area T of the spherical image CE (S380).

FIG. 17 is an illustration for explaining generation of a partial sphere from a partial image that is a planar image. In general, since an image is projected onto a plane in perspective projection, the image is often represented as a planar image in a three-dimensional space as illustrated in FIG. 17A. In the present embodiment, as illustrated in FIG. 17B, the image is represented as a partial sphere, which is a part of a sphere representing the spherical image. The following describes transformation from a planar image (FIG. 17A) to a partial sphere (FIG. 17B).

As illustrated in FIG. 17A, it is assumed that each point (x, y, z) on a plane having a certain angle of view is projected onto a surface of the sphere. The point, where a straight line that connects the origin of the sphere ("Center") and each point (x, y, z), intersects the surface of the sphere, is considered as the point (x', y', z') on the surface of the sphere illustrated in FIG. 17B. Each point on the surface of the sphere is a point whose distance from the origin is equal to the radius of the sphere. If the radius of the sphere is 1, the point (x', y', z') on the surface of the sphere illustrated in FIG. 17B is expressed by the Equation 6.

$$(x',y',z') = (x,y,z) \times 1/\sqrt{x^2+y^2+x^2} \quad \text{(Equation 6)}$$

Figure 18A:
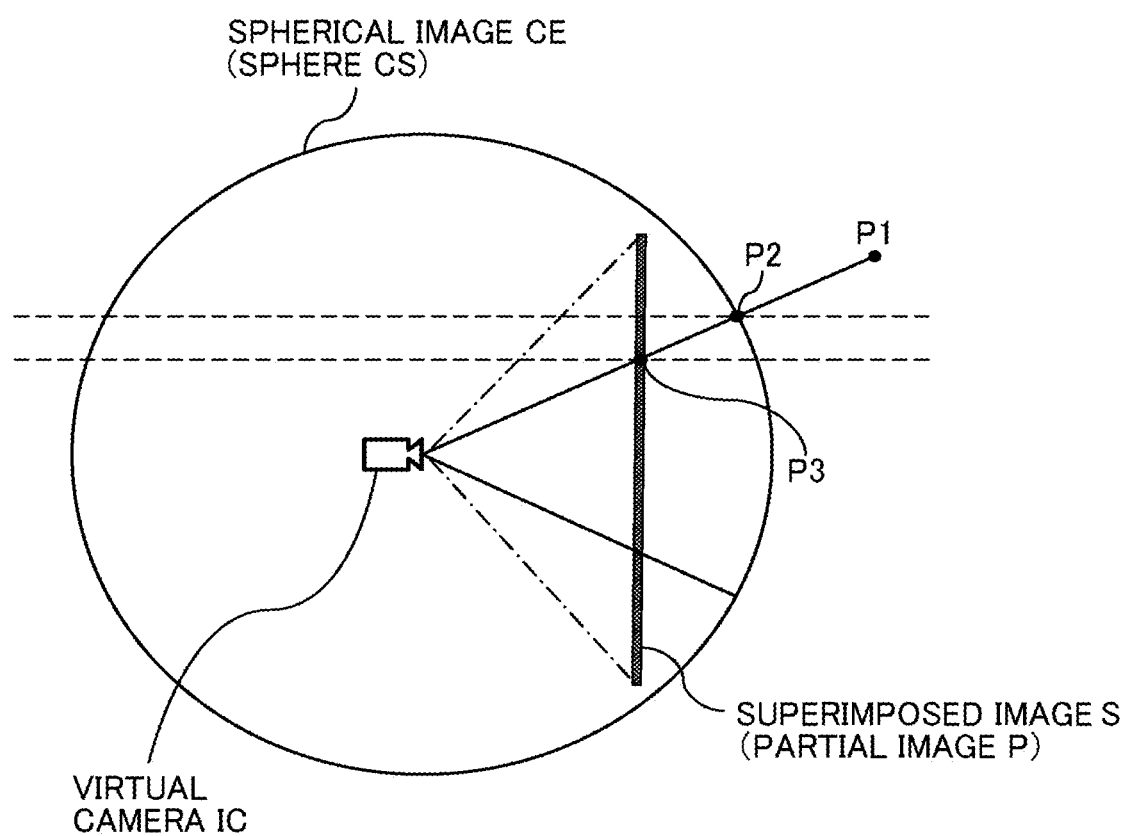
FIGS. 18A and 18B (FIG. 18) are conceptual diagrams illustrating a two-dimensional view of a spherical image superimposed with a partial image, without generating the partial sphere, according to a comparative example.
Figure 18B:
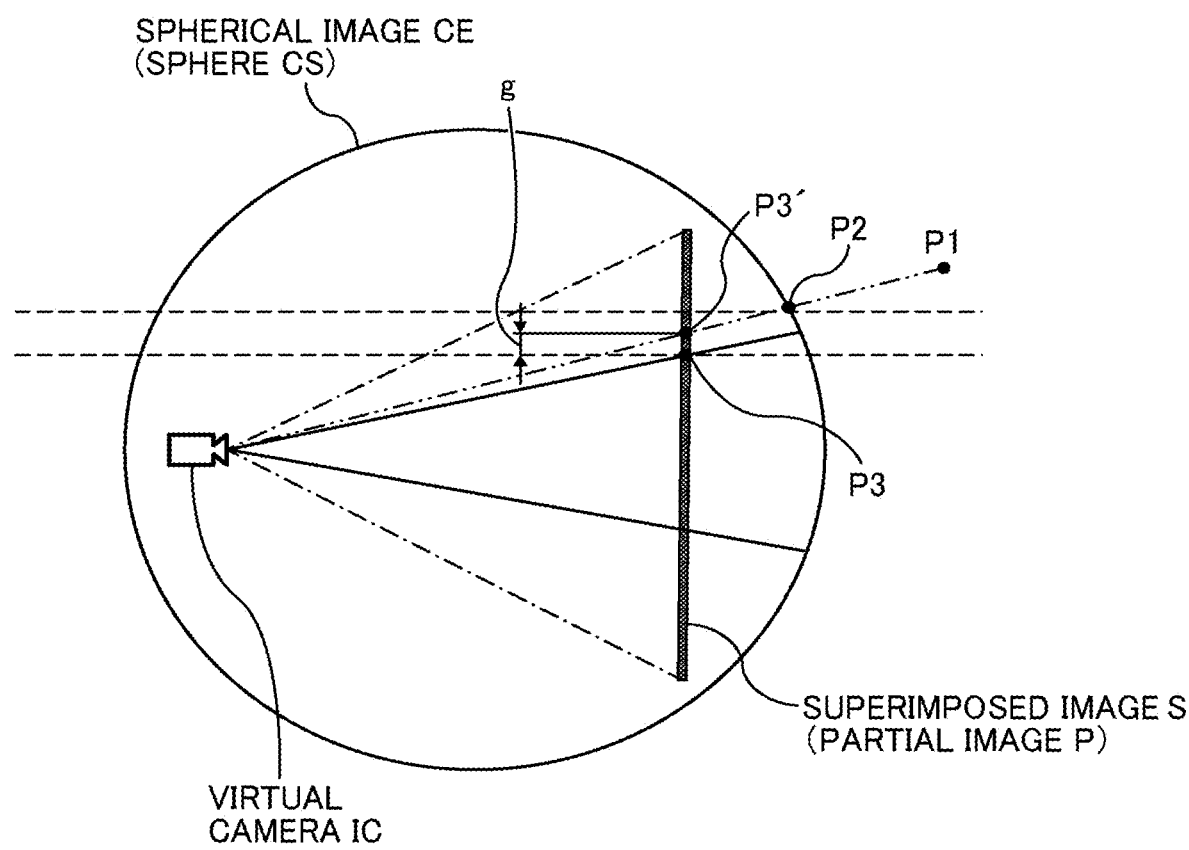
Figure 19A:
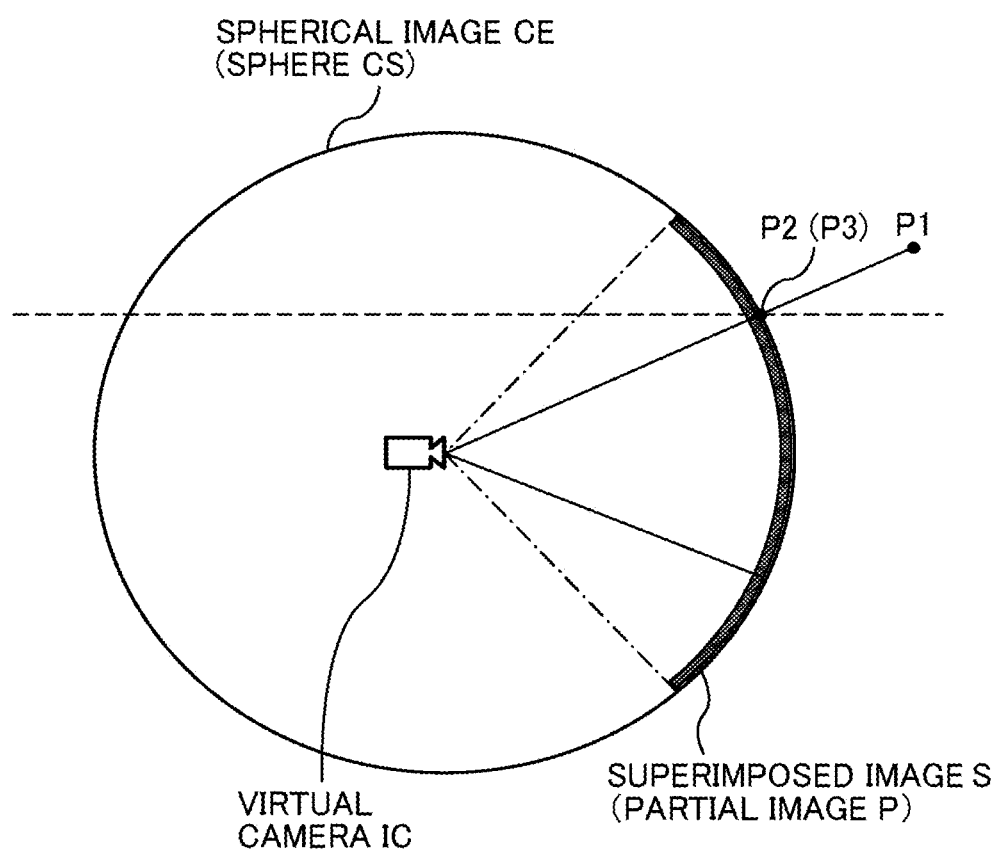
FIGS. 19A and 19B (FIG. 19) are conceptual diagrams illustrating a two-dimensional view of the spherical image superimposed with the partial image, while generating the partial sphere, according to the embodiment.
Figure 19B:
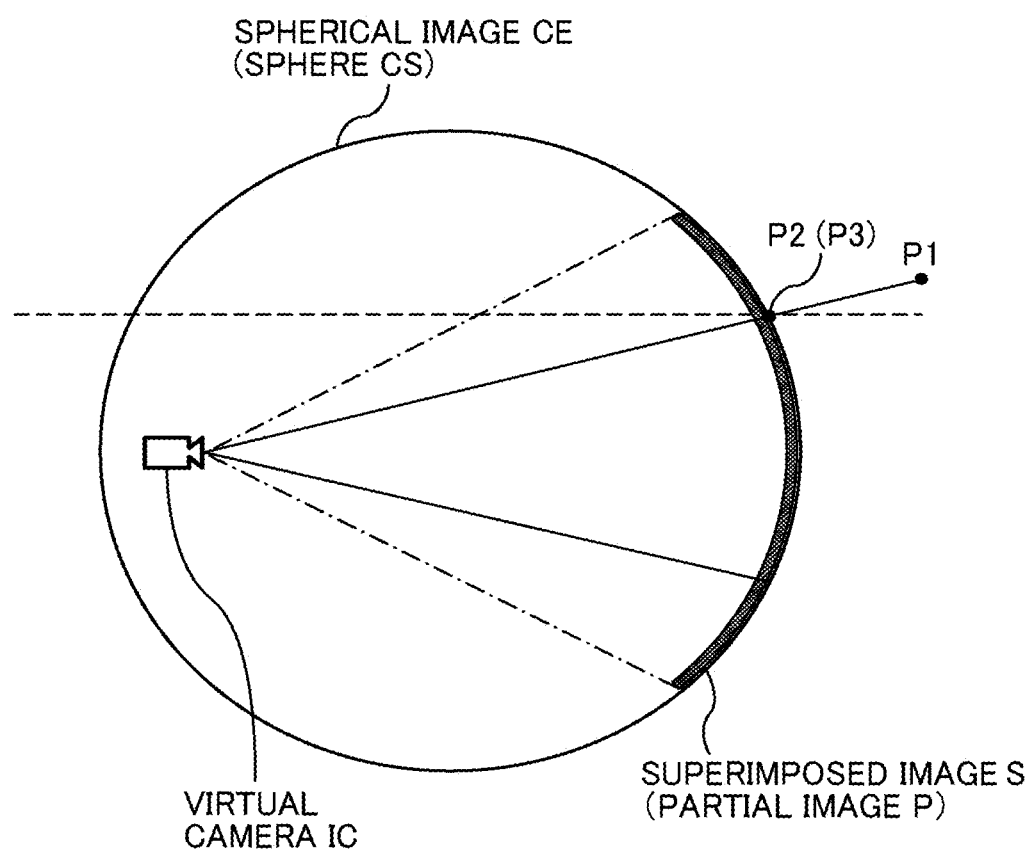

FIGS. 18A and 18B are conceptual diagrams illustrating a two-dimensional view of a spherical image CE superimposed with a partial image P, without generating the partial sphere, according to a comparative example. FIGS. 19A and 19B are conceptual diagrams illustrating a two-dimensional view of the spherical image CE superimposed with the partial image P, while generating the partial sphere, in this embodiment.

As illustrated in FIG. 18A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 18A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 18B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

With the partial sphere being generated, as illustrated in FIGS. 19A and 19B, the superimposed image S is superimposed on the spherical image CE at right positions, while compensating the shift. More specifically, as illustrated in FIG. 19A, when the virtual camera IC is at the center of the sphere CS, the object P2 and the object P3 are positioned along the straight line connecting the virtual camera IC and the object P1. As illustrated in FIG. 19B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

While, in this embodiment, the spherical image CE is superimposed with the partial image P, while generating the partial sphere as illustrated in FIGS. 19A and 19B, in another embodiment, the spherical image CE may be superimposed with the partial image P without generating the partial sphere as illustrated in FIGS. 18A and 18B.

Figure 20A:
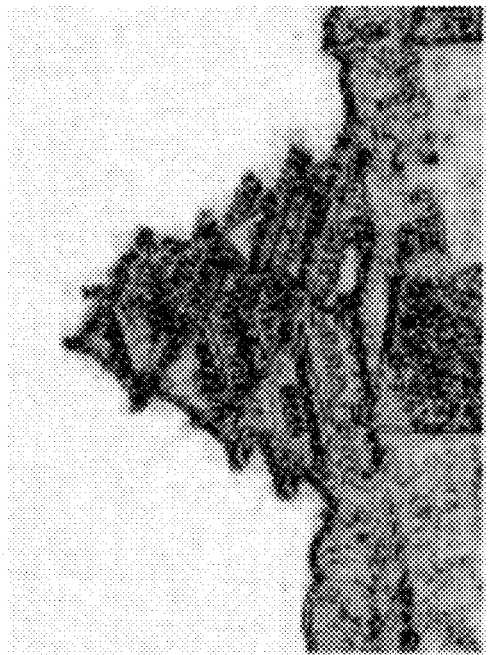
FIG. 20A is an illustration of an example spherical image, when displayed as a wide-angle image, without a partial image being superimposed.
Figure 20B:
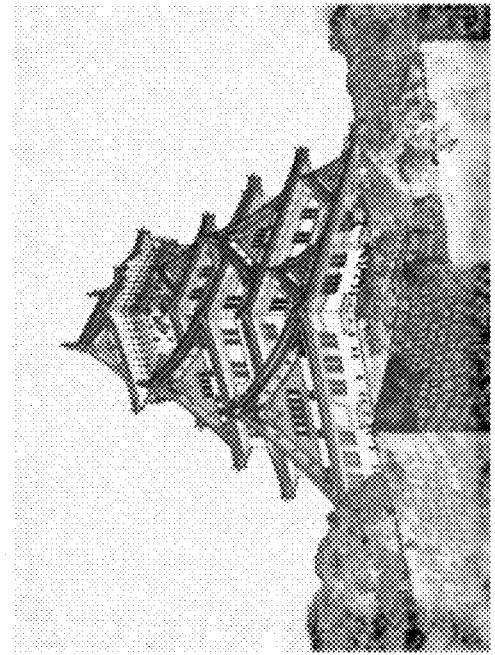
FIG. 20B is an illustration of an example spherical image, when displayed as a telephoto image, without a partial image being superimposed.
Figure 20C:
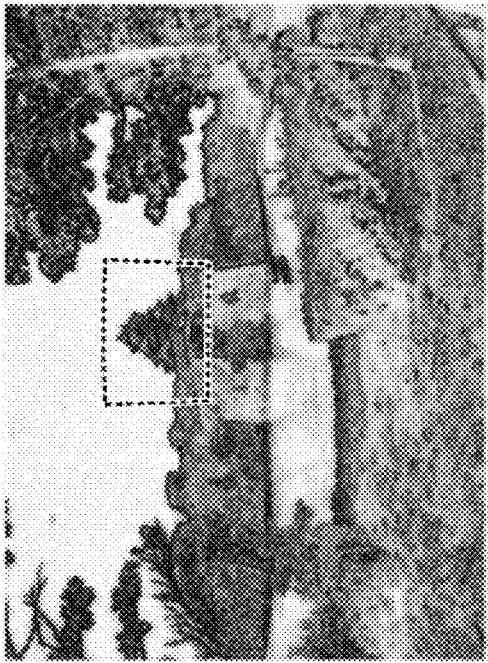
FIG. 20C is an illustration of an example spherical image, when displayed as a wide-angle image, with a partial image being superimposed.
Figure 20D:
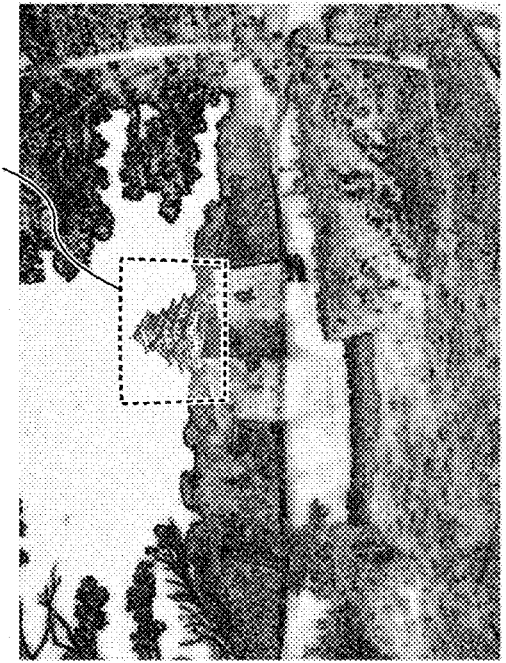
FIG. 20D is an illustration of an example spherical image, when displayed as a telephoto image, with a partial image being superimposed.

FIG. 20A illustrates the spherical image CE, when displayed as a wide-angle image. Here, the partial image P is not superimposed on the spherical image CE. FIG. 20B illustrates the spherical image CE, when displayed as a telephoto image. Here, the partial image P is not superimposed on the spherical image CE. FIG. 20C illustrates the spherical image CE, superimposed with the partial image P, when displayed as a wide-angle image. FIG. 20D illustrates the spherical image CE, superimposed with the partial image P, when displayed as a telephoto image. The dotted line in each of FIGS. 20A and 20C, which indicates the boundary of the partial image P, is shown for the descriptive purposes. Such dotted line may be displayed, or not displayed, on the display 517 to the user.

It is assumed that, while the spherical image CE without the partial image P being superimposed, is displayed as illustrated in FIG. 20A, a user instruction for enlarging an area indicated by the dotted area is received. In such case, as illustrated in FIG. 20B, the enlarged, low-definition image, which is a blurred image, is displayed to the user. As described above in this embodiment, it is assumed that, while the spherical image CE with the partial image P being superimposed, is displayed as illustrated in FIG. 20C, a user instruction for enlarging an area indicated by the dotted area is received. In such case, as illustrated in FIG. 20D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition partial image is superimposed on that section, the high-quality image will be displayed to the user such that the user is able to read those characters.

As described above, according to the present embodiment, the spherical image capturing device 1 generates a low-definition, whole image from a high-definition, spherical image (equirectangular projection image) (S140). The spherical image capturing device 1 further generates a high-definition, partial image having a converted projection, from the high-definition, spherical image (equirectangular projection image) (S150). The spherical image capturing device 1 transmits data of the low-definition whole image, and data of the high-definition partial image to the smart phone 5.

The smart phone 5 superimposes the high-definition partial image on the low-definition whole image (S360), and converts projection of the superimposed image according to the line of sight and the angle of view specified by the user (viewer) (S370).

As described above, the spherical image capturing device 1, which has obtained a high-definition spherical image of an object, transmits a partial image that is most likely to have an area of user's interest as a high-definition image, and a whole image that shows an entire image as a low-definition image. The spherical image capturing device 1 further converts projection of the high-definition partial image, before transmission of such image.

Accordingly, even when the low-definition whole image and the high-definition partial image are generated in different projections (projective spaces), projection of the high-definition partial image has been converted before being transmitted. Accordingly, the smart phone 5 is able to combine these images, without requiring projection transformation.

Further, the smart phone 5 receives a reduced data size, as the spherical image is lowered in image definition. This reduces a data size for transmission, such that loads on the network is reduced.

The following describes the image capturing system according to a second embodiment.

<Overview of Image Capturing System>

Figure 21:
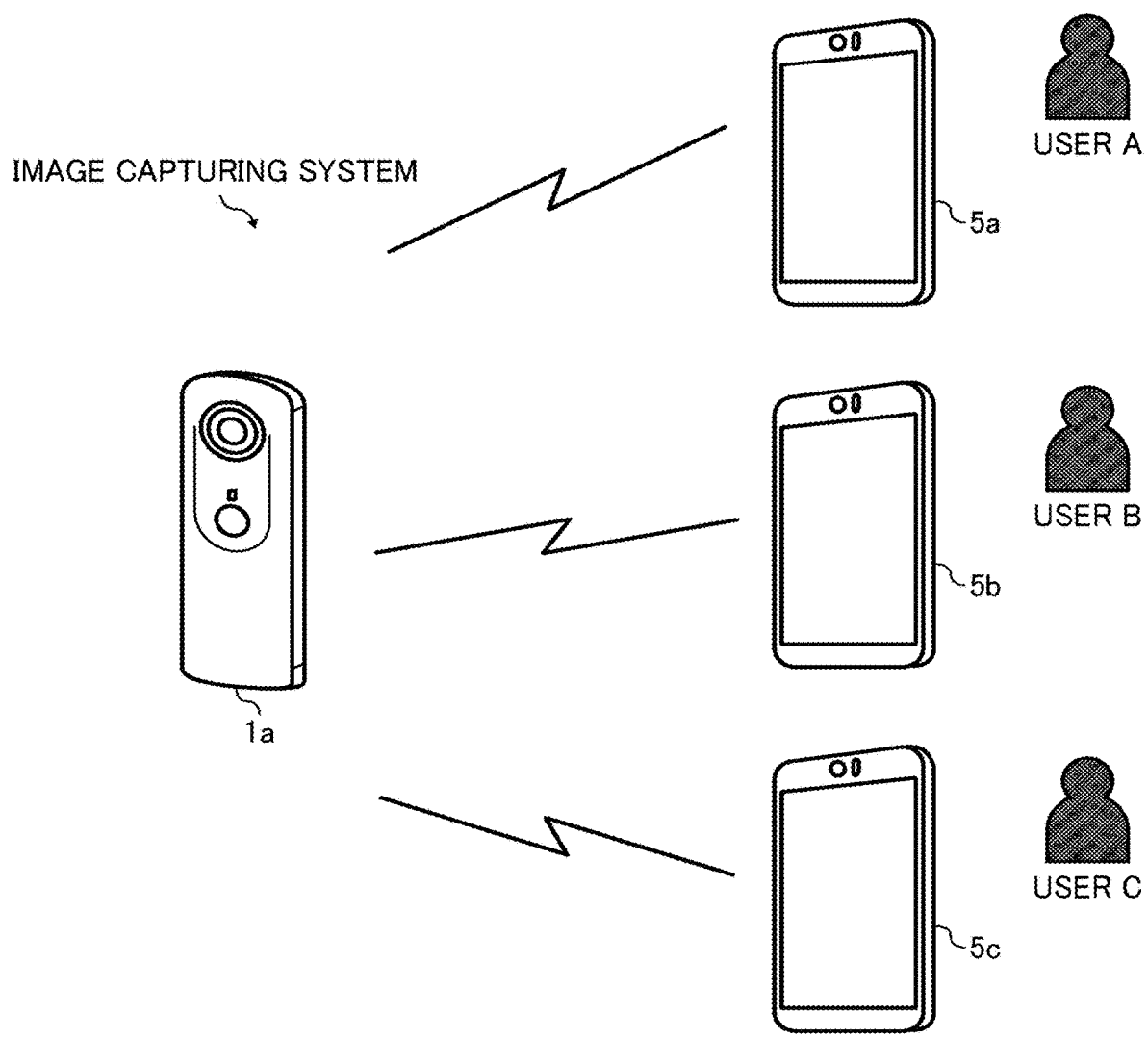
FIG. 21 is a schematic view illustrating an image capturing system according to a second embodiment.

First, referring to FIG. 21, an overview of the image capturing system is described according to the second embodiment. FIG. 21 is a schematic view illustrating the image capturing system according to the second embodiment.

As illustrated in FIG. 21, the image capturing system includes a spherical image capturing device 1a, and a plurality of smart phones 5a, 5b, and 5c. The user A operates the smart phone 5a. In such case, the user A is a viewer, who views an image displayed at the smart phone 5a. The user B operates the smart phone 5b. In such case, the user B is a viewer, who views an image displayed at the smart phone 5b. The user C operates the smart phone 5c. In such case, the user C is a viewer, who views an image displayed at the smart phone 5c. Any one of the smart phones 5a and 5b is able to transmit instruction data to the spherical image capturing device 1a, while the smart phone 5c is not able to transmit instruction data to the spherical image capturing device 1a.

The spherical image capturing device 1a is substantially similar in hardware structure to the spherical image capturing device 1 of the first embodiment. The spherical image capturing device 1a is provided with additional functions. The smart phones 5a and 5b are each substantially similar in hardware structure to the smart phone 5 of the first embodiment. The smart phones 5a and 5b are each provided with additional functions. The smart phone 5c is substantially similar in hardware structure to the smart phone 5 of the first embodiment. The smart phones 5c is not provided with some functions that have been provided to the smart phone 5. The system of FIG. 21 includes two smart phones 5a and 5b having the same functions, and one smart phone 5c having functions different from those of the other smart phones 5a and 5b, however, this is just an example. That is, three or more smart phones may be provided that are similar in function to the smart phone 5a. Two or more smart phones may be provided that are similar in function to the smart phone 5c.

The spherical image capturing device 1a is substantially similar in hardware structure to the spherical image capturing device 1 of the first embodiment illustrated in FIG. 9, such that description thereof is omitted. Moreover, since the smart phones 5a, 5b, and 5c each have the same hardware configuration as that of the smart phone 5 illustrated in FIG. 10, description thereof is omitted.

<Functional Configuration>

Figure 22:
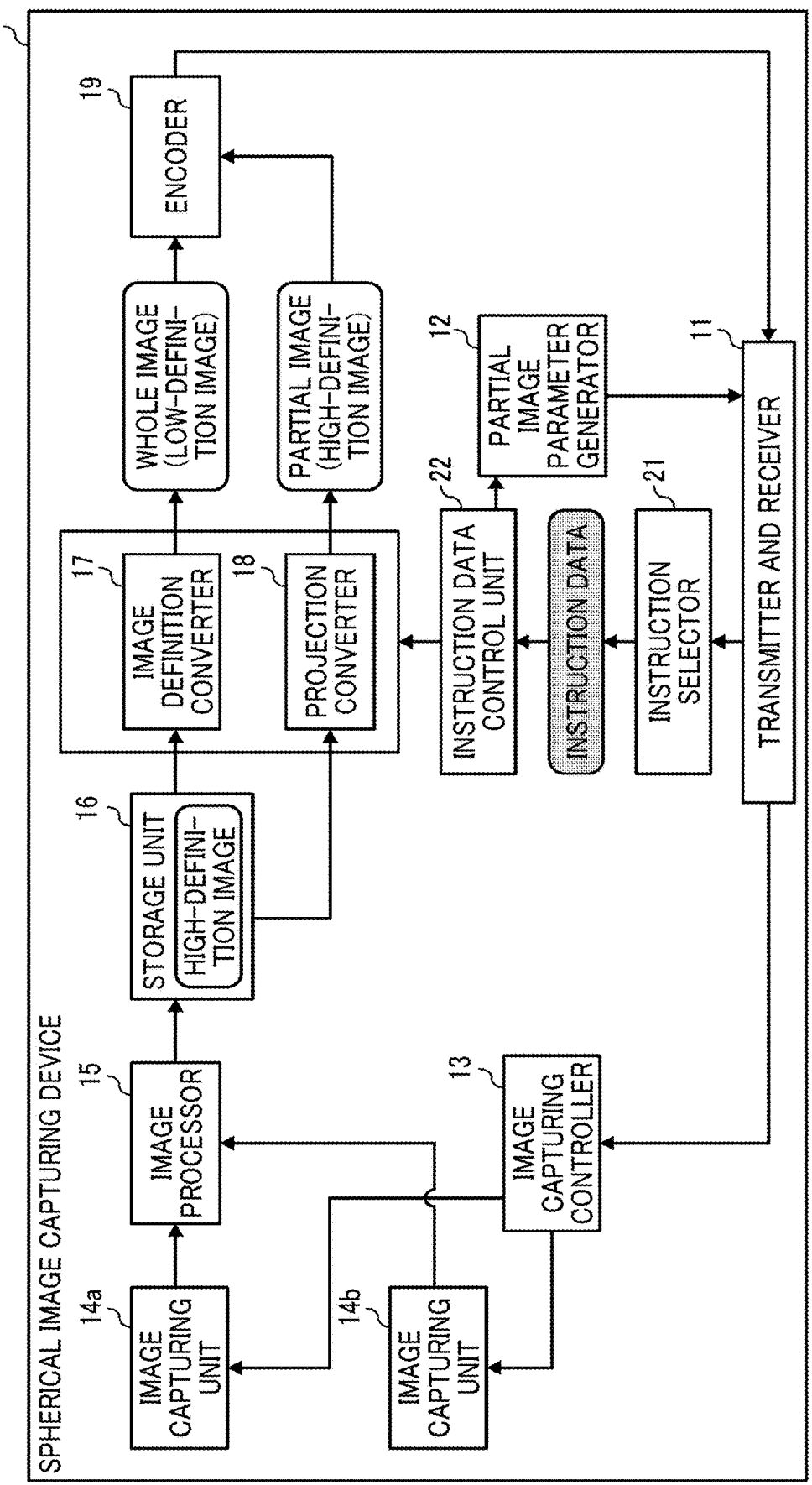
FIG. 22 is a schematic block diagram illustrating a functional configuration of a spherical image capturing device according to the second embodiment.
Figure 23:
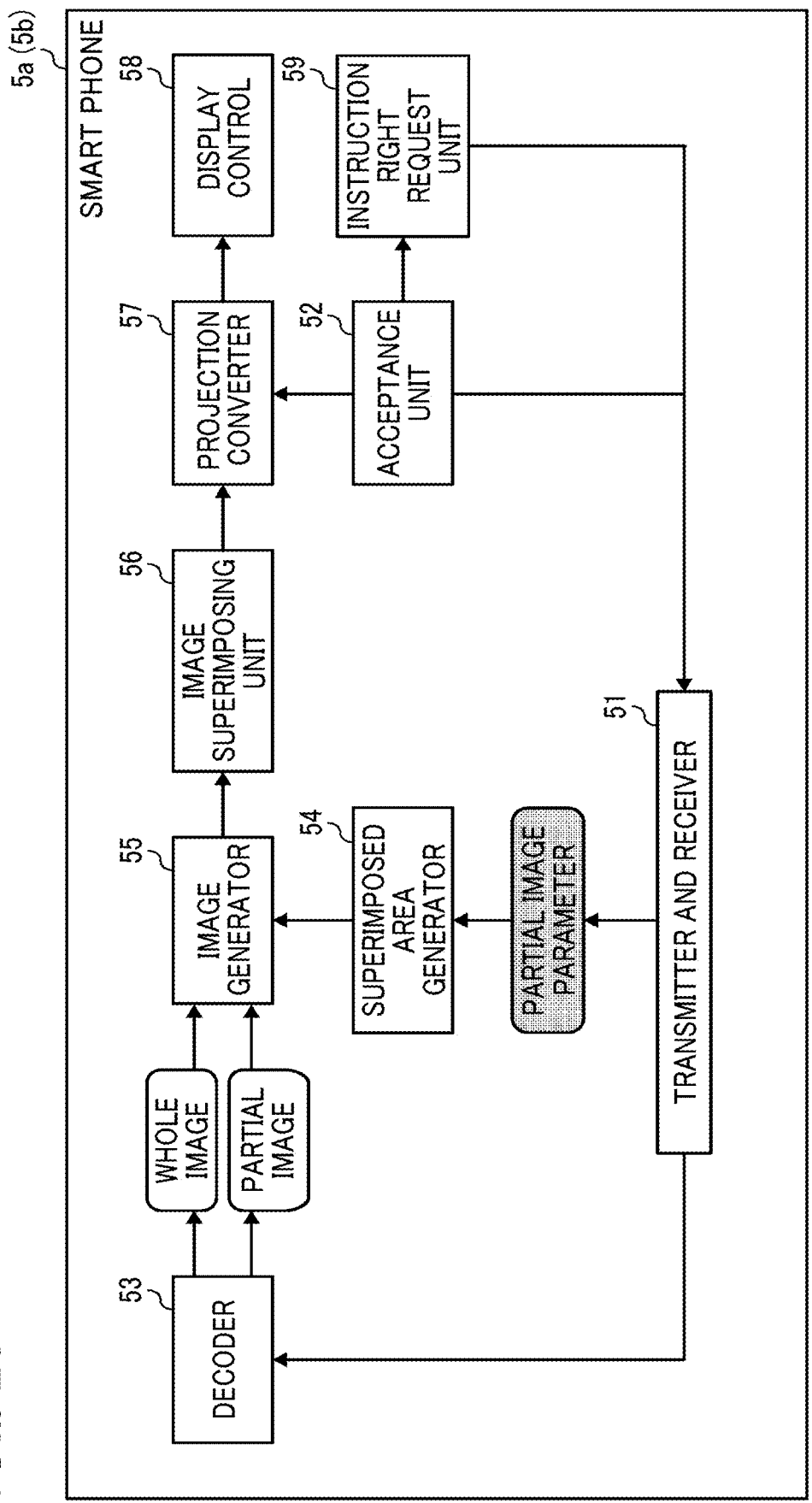
FIG. 23 is a schematic block diagram illustrating a functional configuration of a smart phone, according to the second embodiment.
Figure 24:
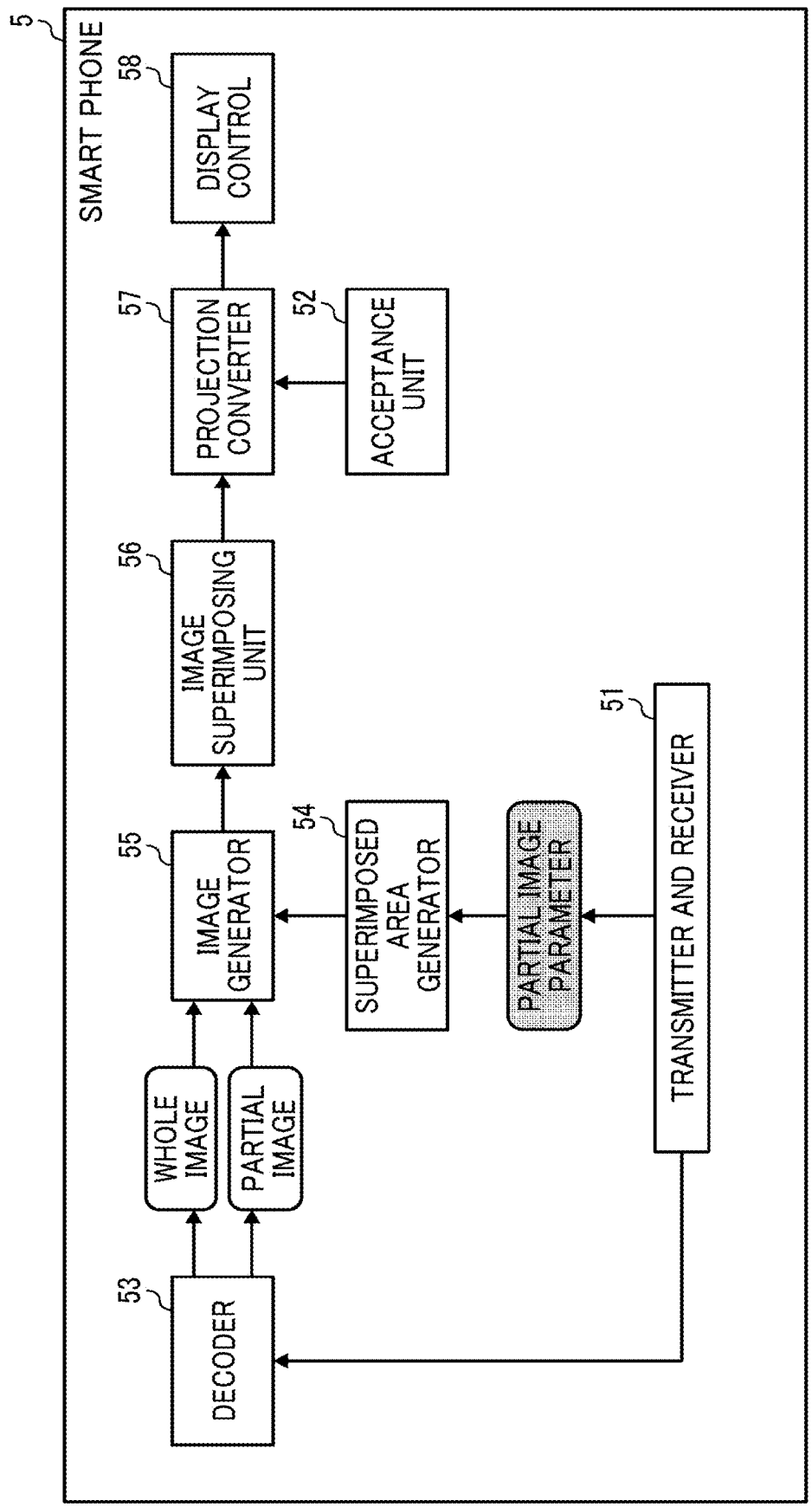
FIG. 24 is a schematic block diagram illustrating a functional configuration of a smart phone, different from the smart phone of FIG. 23, according to the second embodiment.

Referring now to FIGS. 22 to 24, a functional configuration of the image capturing system is described according to the second embodiment. FIG. 22 is a schematic block diagram illustrating a functional configuration of the spherical image capturing device 1a according to the second embodiment. FIG. 23 is a schematic block diagram illustrating a functional configuration of each of the smart phone 5a and 5b according to the second embodiment. FIG. 24 is a schematic block diagram illustrating a functional configuration of the smart phone 5c according to the second embodiment.

<Functional Configuration of Spherical Image Capturing Device>

As illustrated in FIG. 22, the spherical image capturing device 1a includes an instruction selector 21 and an instruction data control unit 22, in addition to the functional units illustrated in FIG. 11. These units are functions that are implemented by or that are caused to function by operating any of the elements illustrated in FIG. 9 in cooperation with the instructions of the CPU 111 according to the spherical image capturing device control program expanded from the SRAM 113 to the DRAM 114.

<Functional Configuration of Spherical Image Capturing Device>

Next, referring to FIG. 22, functions of the instruction selector 21 and the instruction data control unit 22 are described in detail.

The instruction selector 21 selects instruction data to be used by the spherical image capturing device 1a, from the instruction data that are respectively received from the smart phones 5a and 5b at the transmitter and receiver 11, according to instruction right request data added to the instruction data. The instruction right request data is data requesting the spherical image capturing device 1a to use, with priority, the instruction data from a specific smart phone 5 as a transmission source. The instruction right request data includes a terminal ID identifying the specific smart phone 5 (in this example, either the smart phone 5a or 5b) as a transmission source of such request.

For example, when the instruction data is sent from the smart phone 5b immediately after the instruction data is sent from the smart phone 5a to the spherical image capturing device 1a, the spherical image capturing device 1a uses the instruction data sent from the smart phone 5a to transform projection of the partial image, without referring to the instruction data sent from the smart phone 5b. The instruction selector 21 temporarily (for example, for 30 seconds) stores, in its internal memory, entire or a part of the instruction right request data (such as the terminal ID) having been added to the instruction data that is firstly received from a specific smart phone. When any other instruction data is received while such instruction right request data is being stored, the instruction selector 21 determines whether the terminal ID of the stored instruction right request data is the same as the terminal ID obtained from the other instruction data (that is, the terminal ID included as the instruction right request data). When the terminal IDs differ, the instruction selector 21 controls not to use the other instruction data. When a predetermined time period elapses, the instruction selector 21 deletes the stored instruction right request data from the internal memory. The instruction selector 21 may be implemented by instructions of the CPU 111.

The instruction data control unit 22 determines whether an angle of view of an area CA in the whole image, to be cut out as a partial image, indicated by the instruction data, is less than a threshold size (horizontal angle of view threshold and a vertical angle of view threshold) set for a specific size of image data for transmission. As described below, the threshold size set according to a specific size of image data for transmission includes a threshold value of horizontal angle of view, and a threshold value of vertical angle of view. When the angle of view of the area CA in the whole image corresponding to the partial image is less than the threshold, the instruction data control unit 22 controls reduction size of the area CA, such that the angle of view of the CA is kept at least at the threshold value, irrespective of the instruction data. With this control on reduction size, the partial image is generated so as to include an area, which is likely to be selected by the user. The control on reduction size, which is to put limits on reduction in size of the area CA to be cut out as the partial image, is any processing to sufficiently maintain a minimum size of the area CA of partial image, such that the partial image includes an area, which is most likely to be selected by the user. Accordingly, even when the user at the smart phone 5a, 5b, or 5c selects any area, other than the area instructed by the instruction data, as a viewable area for display, the smart phone 5a, 5b, or 5c is able to display a selected area in the viewable area, based on the high-definition, partial image that includes such area. This increases operability of the user.

The partial image parameter generator 12, in the second embodiment, generates partial image parameters based on the instruction data, which is controlled by the instruction data control unit 22. More specifically, the instruction data control unit 22 modifies the instruction data, such that an area CA to be cut out from the whole image, as a partial image, is to have at least a threshold angle of view, when an angle of view instructed by the instruction data is less than the threshold angle of view. The partial image parameter generator 12 generates image parameters, based on this modified instruction data. Accordingly, a superimposed area of the spherical image CE, on which the superimposed image (that is, the partial image being superimposed on the partial sphere) is to be superimposed, can be specified based on the modified instruction data.

(Control Size Reduction of Area to be Cut Out as Partial Image)

Figures 25A, 25B:
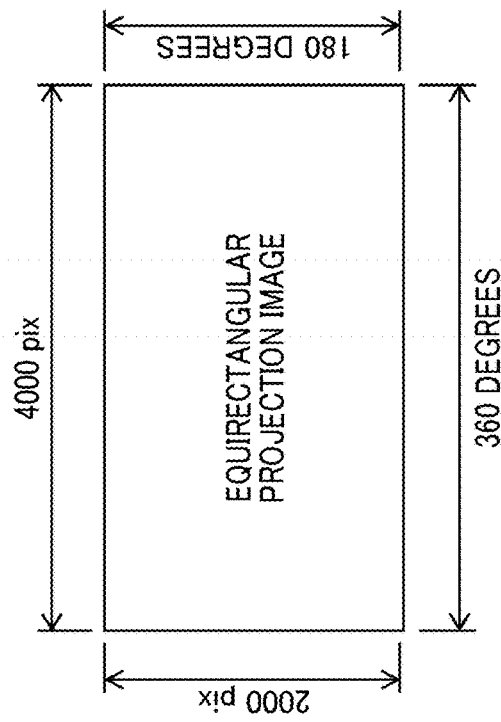
FIG. 25A is a conceptual diagram illustrating an example instruction data control table.
FIG. 25B is a conceptual diagram illustrating an example equirectangular projection image.

Referring to FIGS. 25 and 26, processing to control reduction size of an area CA to be cut out as the partial image, is described according to the embodiment. FIG. 25A is a conceptual diagram illustrating an example instruction data control table. FIG. 25B is a conceptual diagram illustrating an example equirectangular projection image. The instruction data control table is stored in the SRAM 113, and managed by the instruction data control unit 22.

As illustrated in FIG. 25A, the instruction data control table stores a threshold value of an angle of view for each of a plurality of configuration patterns ("Configuration 1" to "Configuration 4"). For each configuration pattern, a threshold value of an angle of view of an area CA as a partial image, is associated with a size of a high-definition image and a size of a partial image to be transmitted. In this example, the threshold of the angle of view includes a threshold of a horizontal angle of view and a threshold of a vertical angle of view. Alternatively, the threshold of the angle of view may only include one of the threshold of the horizontal angle of view and the threshold of the vertical angle of view. As the size of the high-definition image, which is the whole image, a number of horizontal pixels and a number of vertical pixels for a high-definition image is stored. As the size of the partial image, a number of horizontal pixels and a number of vertical pixels for a partial image is stored.

The table of FIG. 25A stores four configuration patterns, however, any number of configuration patterns may be stored, such that the patterns may be between one and three, or more than five. While the instruction data control table of FIG. 25A is previously prepared, the instruction data control table does not have to be provided. In such case, a threshold value of an angle of view may be calculated using the equation, for example, as described below.

The following example describes how the threshold value of an angle of view is obtained for the configuration pattern 1.

As described above referring to FIG. 7, an area size of the image can be represented by an imaging direction of the virtual camera IC. More specifically, the horizontal length "w" of the partial image can be represented by a horizontal angle of view, and the vertical length "h" of the partial image can be represented by a vertical angle of view.

As illustrated in FIG. 25B, for the configuration pattern 1, the high-definition, equirectangular projection image stored in the storage unit 16 has 4000 pixels in the horizontal direction, and 2000 pixels in the vertical direction. Further, the horizontal length "w" of the image can be represented by a horizontal angle of view of 360 degrees, and the vertical length "h" of the image can be represented by a vertical angle of view of 180 degrees, with the horizontal-to-vertical length ratio being 2:1. In such case, an angle per pixel is obtained by dividing 360 degrees by 4000 pixels, which is 0.09 degrees. Assuming that the partial image is a perspective projection image obtained by applying projection transformation to the equirectangular projection image, a threshold value of the angle of view can be obtained from information on an image size of the partial image, using this value of angle per pixel. The information on size of the partial image is specified in the instruction data received from the smart phone.

More specifically, the threshold of horizontal angle of view can be obtained by (360 degrees/the number of horizontal pixels for the high-definition image)*the number of horizonal pixels for the partial image.

The threshold of vertical angle of view can be obtained by (180 degrees/the number of vertical pixels for the high-definition image)*the number of vertical pixels for the partial image.

Although a ratio of the angle of view to the pixel is not constant depending on the area in the perspective projection image, for the purposes of estimation, it is assumed that such ratio is constant over the equirectangular projection image.

When the partial image has 1920 pixels in horizontal direction, using the above-described equation, the threshold of horizontal angle of view becomes 0.09 degrees/pixel× 1920 pixels=172.8 degrees. Accordingly, in the instruction data control table of FIG. 25A, the threshold of the horizontal angle of view is set to 172.8 degrees, for the configuration pattern 1, which is the case when the size of the partial image for transmission is 1920 pixels by 1080 pixels.

Similarly, when the partial image has 1080 pixels in vertical direction, using the above-described equation, the threshold of vertical angle of view becomes 0.09 degrees/ pixel×1080 pixels=97.2 degrees. Accordingly, in the instruction data control table of FIG. 25A, the threshold of the vertical angle of view is set to 97.2 degrees, for the configuration pattern 1, which is the case when the size of the partial image for transmission is 1920 pixels by 1080 pixels.

Accordingly, even when the instruction data sent from the smart phone 5a to the spherical image capturing device 1a specifies an area CA in the whole image, as having a horizontal angle of view smaller than 172.8 degrees, for example, the instruction data control unit 22 controls size reduction of the area CA, such that the area CA has at least 172.8 degrees. That is, irrespective of the instruction data, the instruction data control unit 22 instructs to have an area CA that at least has an angle of view of 172.8 degrees, such that the resultant partial image is generated to include at least the area CA of the threshold angle of view.

Referring now to FIG. 26, the processing to control size reduction of the area CA, which is to be cut from the whole image as the partial image is further described. As described above, the processing to control size reduction of the area CA, is any processing that prevents a size of the area CA from being too small. If the area CA is too small, the resultant partial image may not include an area, which is most likely to be selected by the user for viewing.

FIG. 26A is a conceptual diagram of image data transmitted from the spherical image capturing device 1a to the smart phone, when no processing to control size reduction is performed. FIG. 26B is a conceptual diagram of image data transmitted from the spherical image capturing device 1a to the smart phone, when processing to control size reduction is performed.

In the first embodiment, as illustrated in FIG. 26A, in response to the instruction data received from the smart phone 5a or 5b, the image definition converter 17 converts the equirectangular projection image EC1 to the low-definition, whole image, by reducing a size of the equirectangular projection image EC1 according to an image size for transmission that is specified by the instruction data. In case the instruction data specifies an area CA, to be cut out from the equirectangular projection image EC1 as the whole image, to generate the partial image, the projection converter 18 extracts the area CA, as specified by the instruction data, as a partial image P11 from the whole image, and enlarges a size of the partial image P11 according to the image size for transmission. The projection converter 18 then applies projection transformation to the partial image.

In the second embodiment, as illustrated in FIG. 26B, in response to the instruction data received from the smart phone 5a or 5b, the image definition converter 17 converts the equirectangular projection image EC1 to the low-definition, whole image, by reducing a size of the equirectangular projection image EC1 according to an image size for transmission that is specified by the instruction data, in a substantially similar manner as described above referring to the first embodiment. In case the instruction data specifies the area CA, to be cut out from the equirectangular projection image EC1 as the whole image, to generate the partial image, the projection converter 18 extracts an area CA, which is equal in size to the image size for transmission, as a partial image P22 from the whole image. The projection converter 18 then applies projection transformation to the partial image.

<Functional Configuration of Smart Phone with Instruction Right Issuing Capability>

As illustrated in FIG. 23, the smart phones 5a and 5b each have an instruction right request unit 59, compared to the smart phone 5 in the first embodiment. The instruction right request unit 59 is a function that is implemented by or that is caused to function by operating any of the hardware elements illustrated in FIG. 10 in cooperation with the instructions of the CPU 501 according to the control program for the smart phone 5a or 5b, expanded from the EEPROM 504 to the RAM 503.

The following describes a function of the instruction right request unit 59.

The instruction right request unit 59 issues an instruction right for causing the spherical image capturing device 1a to use, with priority, instruction data issued at the own smart phone 5a (or 5b) in response to receiving a user instruction at the acceptance unit 52. The transmitter and receiver 51 transmits the instruction right (instruction request data) that has been issued, with the instruction data, to the spherical image capturing device 1a. As illustrated in FIG. 21, when the system includes a plurality of smart phone 5a and 5b each capable of transmitting instruction data to the spherical image capturing device 1a, the instruction data from the smart phones 5a and 5b may conflict each other. In view of this, an instruction right is issued to avoid any conflict among instruction data from a plurality of smart phones.

<Functional Configuration of Smart Phone without Instruction Right Issuing Capability>

As illustrated in FIG. 24, the smart phone 5c is substantially similar to the smart phone 5 of the first embodiment, illustrated in FIG. 12, except that the acceptance unit 52 cannot accept a user instruction from the smart phone 5, such that description of its functional configuration is omitted. Unlike the smart phones 5a and 5b, the smart phone 5c does not have a function of transmitting instruction data to the spherical image capturing device 1a. Accordingly, the smart phone 5c does not conflict with any one of the smart phones 5a and 5b, at least in terms of processing instruction data.

<Operation>

Figure 27:
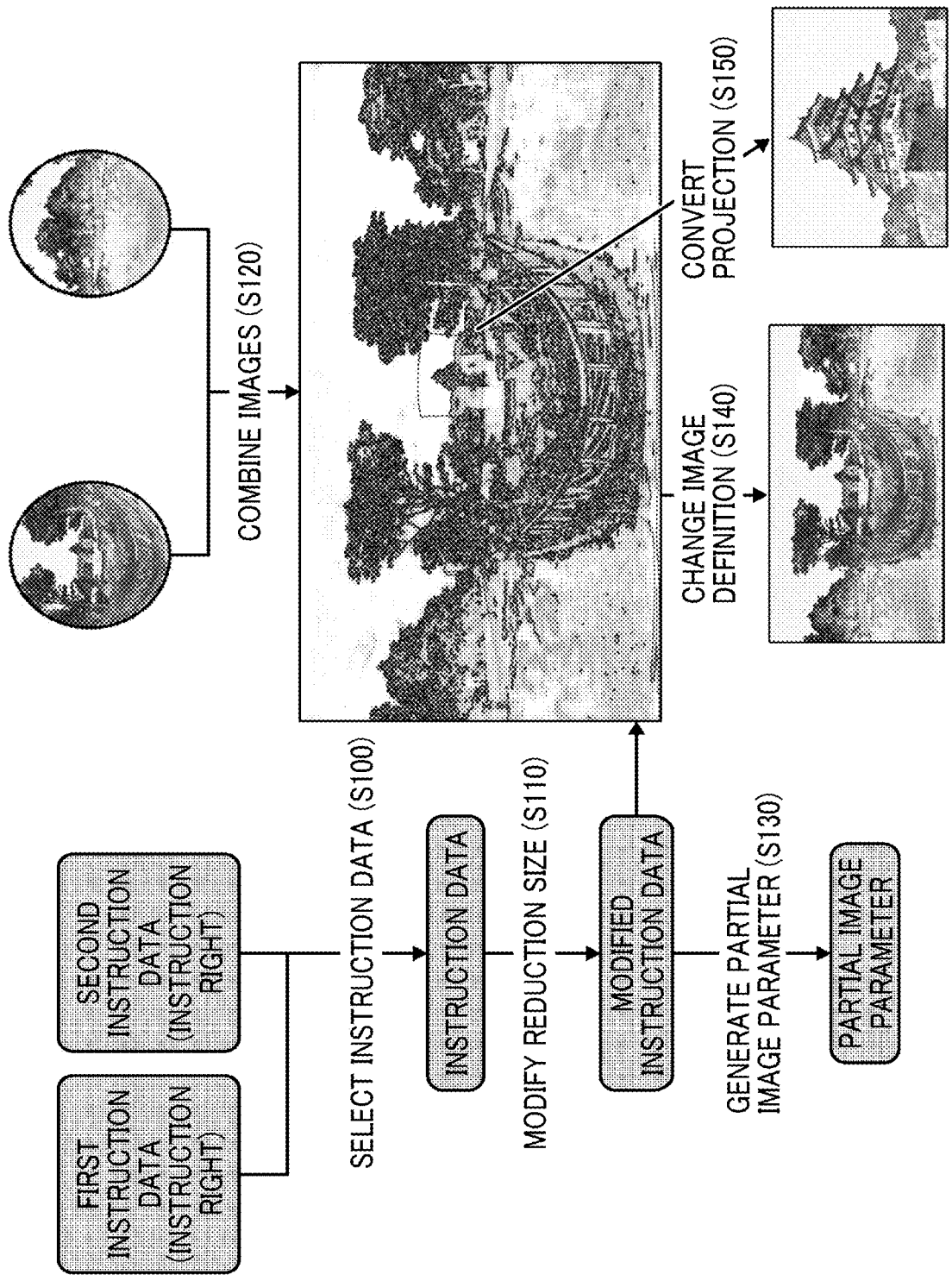
FIG. 27 is a conceptual diagram for illustrating image processing performed by the spherical image capturing device, and images generated along with processing, according to the second embodiment.

Referring to FIGS. 27 and 28, operation performed by the image capturing system is described according to the second embodiment. The following describes only processing that differs from that of the first embodiment.

<Processing of Spherical Image Capturing Device>

First, referring to FIG. 27, processing of the spherical image capturing device 1a is described according to the embodiment. FIG. 27 is a conceptual diagram for illustrating image processing performed by the spherical image capturing device 1a, and images generated along with processing, according to the second embodiment.

As illustrated in FIG. 27, when first instruction data and second instruction data are received, respectively, from the smart phone 5a and the smart phone 5b at substantially the same time, the instruction selector 21 of the spherical image capturing device 1a selects one of the first instruction data received from the smart phone 5a and the second instruction data received from the smart phone 5b (S100). Specifically, the instruction selector 21 selects instruction data to be used based on the instruction right request data included in the instruction data. For example, the instruction selector 21 selects, as the instruction data to be used, any instruction data that is firstly received at the transmitter and receiver 11 out of two instruction data items. The instruction right request data has been issued by the instruction right request unit 59 of each of the smart phone 5a and 5b.

Next, the instruction data control unit 22 controls size reduction of the area CA to be cut out as the partial image, when the instruction data instructs to reduce a size of the area CA to be less than a preset threshold according to a size of an image for transmission. Accordingly, the instruction data is modified, such that the partial image having at least a threshold angle of view can be displayed at any of the smart phones 5a, 5b, and 5c (S110).

In this embodiment, the instruction data, which is modified at S110, is used in processing after S130. Referring now to FIG. 28, display of an image at the smart phone is described in the first embodiment and the second embodiment. FIG. 28A illustrates a partial image P11, displayed without processing to control size reduction of the area CA. FIG. 28B illustrates an area of the whole image, other than the partial image P11, without processing to control size reduction of the area CA. FIG. 28C illustrates a partial image P21, with processing to control size reduction of the area CA to include a partial image P22 as data for transmission. FIG. 28D illustrates an area of the whole image, other than the partial image P21, but including at least a part of the partial image P22, with processing to control size reduction of the area CA. The images illustrated in FIGS. 28A and 28B are generated through operation described above referring to FIG. 26A. The images illustrated in FIGS. 28C and 28D are generated through operation described above referring to FIG. 26B.

In the first embodiment, as illustrated in FIG. 26A, assuming that the user Y specifies the partial image P11 at the smart phone 5, the display control 58 of the smart phone 5 initially displays a viewable-area image Q11 as illustrated in FIG. 28A, based on the image transmitted from the spherical image capturing device 1. The viewable-area image Q11 illustrated in FIG. 28A, corresponds to the partial image P11 illustrated in FIG. 26A, which is a central part of a castle tower in the whole image. When the user Y instructs to display the upper part of the castle tower, by changing a viewable area from the viewable-area image illustrated in FIG. 28A to other area in the whole image, the display control 58 controls the display 517 to display a viewable-area image Q12 illustrated in FIG. 28B. As illustrated in FIG. 28B, except for the central part of the castle tower, which is the partial image P11, the whole image (that is, the equirectangular projection image EC1 in FIG. 26A) is low in definition. Accordingly, if any area other than the partial image P11 is enlarged, the viewable-area image Q12 that is low in image quality is displayed.

In order to have the viewable-area image Q12 in higher image definition, the smart phone 5 may send instruction data specifying the viewable area, which corresponds to the area displayed in FIG. 28B, to the spherical image capturing device 1. Even if the smart phone 5 sends instruction data to the spherical image capturing device 1, it would take time to receive updated partial image data from the spherical image capturing device 1 especially when there is a delay in data transmission. This causes the low-definition image, as illustrated in FIG. 28B, to be displayed at least temporarily. Moreover, in case there are a plurality of smart phones operated by different users, unless the user has an instruction right (that is, unless the instruction data sent from a smart phone of the user is selected), the instruction data is not referred to by the spherical image capturing device 1. If the instruction data specifying the viewable area is not referred, the smart phone is not able to receive partial image data, in higher image definition, as instructed by the user. This causes the low-definition image, as illustrated in FIG. 28B, to be displayed to the user.

In the second embodiment, as illustrated in FIG. 26B, assuming that the user A specifies the partial image P21 at the smart phone 5a with an instruction right, the spherical image capturing device 1a transmits the partial image P22 including the entire castle tower as illustrated in FIG. 28C. At the smart phone 5a, the display control 58 controls the display 517 to initially display a partial image P21, which is indicated by the broken line in FIG. 28C, as a viewable-area image. The image transmitted from the spherical image capturing device 1a corresponds to the partial image P22, which includes the entire castle tower, as illustrated in FIG. 26B. The partial image P21, which is displayed as the viewable-area image Q21, corresponds to the partial image P21 including the central part of the castle tower, in FIG. 26B.

It is assumed that the user A, who has the instruction right, instructs the smart phone 5a to display an upper part of the castle tower, while the smart phone 5a is displaying the viewable-area image Q21 illustrated in FIG. 28C, which includes the central part of the castle tower. In such case, the smart phone 5a transmits the instruction data specifying the upper part of the castle tower, to the spherical image capturing device 1a, to obtain a high-definition, partial image of the upper part of the castle tower. At least until the high-definition, partial image of the upper part of the castle tower is received, the smart phone 5a controls the display 517 to display the upper part of the castle tower, based on the image illustrated in FIG. 28C, as the viewable-area image Q22 as illustrated in FIG. 28D. Since the upper part of the castle tower is a part of the partial image P22, which is a high-definition image, even when it is enlarged as illustrated in FIG. 28D, the viewable-area image is displayed in high image quality.

Similarly, when any of the user B and user C, who does not have the instruction right, instructs the smart phone 5b or 5c to display an upper part of the castle tower, in the viewable-area image Q21 illustrated in FIG. 28C, the display control 58 of the smart phone 5b or 5c controls the display 517 to display the viewable-area image Q22 as illustrated in FIG. 28D, based on the high-definition partial image P22, which includes the entire castle tower as illustrated in FIG. 28C. Since the upper part of the castle tower is a part of the partial image P22, which is a high-definition image, even when it is enlarged as illustrated in FIG. 28D, the viewable-area image is displayed in high image quality.

Accordingly, even when there is no instruction right as in the case of the smart phone 5b in this example, the smart phone 5b is able to display an enlarged portion of the upper part, or any part in the castle tower with high image quality based on the high-definition partial image, according to an instruction from the user B, based on the partial image P22 including the entire castle tower.

Further, even when the smart phone 5c is not capable of transmitting instruction data, the smart phone 5c is able to display an enlarged portion of the upper part, or any part in the castle tower with high image quality based on the high-definition partial image, according to an instruction from the user C, based on the partial image P22 including the entire castle tower.

As described above, in the second embodiment, when instruction data instructs to cut out an area CA in the whole image, having an angle of view that is less than a threshold of angle of view for a specific image size for transmission, the instruction data control unit 22 controls size reduction of the area CA, such that the area CA has at least an angle of view that is equal to the threshold angle of view. Accordingly, the high-definition partial image, which is generated based on the area CA cut out from the whole image, will be displayed at the smart phone 5.

For example, since the smart phone 5a, 5b, or 5c displays the viewable-area image Q21, based on the partial image P22 including the partial image P21, even when an instruction to display other area is received, the smart phone 5a, 5b, or 5c is able to display the other area of the partial image P22, other than the partial image P21, as the viewable-area image Q22, based on the partial image P22 that is a high-definition image.

More specifically, in the case where the user A or B at the smart phone 5a or 5b has the instruction right, the smart phone 5a or 5b may transmit instruction data specifying the other area, as the viewable-area image Q22, to the spherical image capturing device 1a. At least until the partial image corresponding to the specified other area is received from the spherical image capturing device 1a, the smart phone 5a or 5b is able to display the viewable-area image Q22 with a sufficient level of image quality based on the high-definition partial image.

In the case where the user A or B at the smart phone 5a or 5b has no instruction right, or the user C at the smart phone 5c is not capable of sending instruction data, even when the instruction data cannot be transmitted or accepted at the spherical image capturing device 1a, the smart phone is able to display other area, as the viewable-area image Q22 with a sufficient level of image quality, based on the high-definition, partial image P22. This improves user operability, as the user is able to enjoy the high-definition image, even without having the instruction right.

In the first embodiment, a part of the functions of the spherical image capturing device 1 other than the image capturing function (such as the image capturing units 14a and 14b, the image capturing controller 13, and the image processor 15) may be performed by any device other than the spherical image capturing device 1, such as an image processing server communicable with the spherical image capturing device 1. In such case, the image processing server communicates with the spherical image capturing device 1 and the smart phone 5 through a communication network such as the Internet. In other words, the spherical image capturing device 1 and the image processing server are an example of an image processing apparatus capable of performing image processing on a captured image.

Similarly, in the second embodiment, a part of the functions of the spherical image capturing device 1a other than the image capturing function (such as the image capturing units 14a and 14b, the image capturing controller 13, and the image processor 15) may be performed by any device other than the spherical image capturing device 1a, such as an image processing server communicable with the spherical image capturing device 1a. In such case, the image processing server communicates with the spherical image capturing device 1a and the smart phones 5a, 5b, and 5c through a communication network such as the Internet. In other words, the spherical image capturing device 1a and the image processing server are an example of an image processing apparatus capable of performing image processing on a captured image.

Further, the spherical image capturing devices 1 and 1a are an example of image capturing device, such that the image capturing device includes a digital camera or a smart phone capable of capturing a planar image. In case of the digital camera or smart phone that captures a planar image, the digital camera or smart phone is able to capture a wide-angle view image using a wide-angle lens, for example.

Any one of the smart phones 5, 5a, 5b, and 5c is an example of a communication terminal capable of displaying images using a display device, for example. Other examples of the communication terminal include, but not limited to, a tablet personal computer (PC), a note PC, and a desktop PC, a smart watch, a game machine, and a car navigation system mounted on a vehicle and the like.

In any one of the above-described embodiments, the whole image generated from image data captured at the image capturing units 14a and 14b, is referred to as a wide-angle image, which may also be referred to as a low-definition image when the image is lower in definition than the captured image. The partial image, as a part of the whole image, is referred to as a narrow-angle image, which may also be referred to as a high-definition image when the image is higher in definition than the low-definition whole image. That is, the low-definition image is any image having an angle of view narrower than that of the high-definition image. Accordingly, the low-definition image may be called a wide-angle image, and the high-definition image may be called a narrow-angle image. The high-definition image and the low-definition image are not limited to this example. The low-definition image may be an image of a partial area of the whole image generated from the image data captured at the image capturing units 14a and 14b. That is, even though the term "whole" is used, the whole image may be a part of the captured image, or entire captured image. In such case, the high-definition image, which is the partial image, is an image of a part of the whole image, while the whole image being a part or entire captured image.

In any one of the above-described embodiments, the partial image, which is the planar image, is superimposed on the whole image, which is the spherical image. In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Further, any one of the images described above, such as the whole image and the partial image, may each be generated as any combination of a moving image and a still image. That is, both of the whole image and the partial image may be a moving image, or a still image. Either one of the whole image and the partial image may be a moving image, or a still image.

Further, in any one of the above-described embodiments, the projection converter 18 applies projection transformation to an area CA, cut out from the whole image that is read out from the storage unit 16, to generate a partial image in different projection. Alternatively, the projection converter 18 may apply projection transformation to an area CA, which is made lower in image definition to that of the original whole image, as long as the resultant partial image is higher in image definition than that of the whole image that has been converted into the low-definition image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments, such as the functions described above referring to FIGS. 11, 12, 22, and 23 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), programmable logical circuit (PLD), discrete gate, transistor logical device, and conventional circuit components arranged to perform the recited functions. Further, any one of the above-described memories, or any device capable of storing data, may be implemented by, for example, a USB memory, flash memory, removable disc, ROM, RAM, magnetic disc, and optical disc.

The invention claimed is:

1. An image processing apparatus comprising:
   circuitry configured to:
   obtain a wide-angle image, the wide-angle image being a part of or entire captured image of an object;
   convert the wide-angle image into a wide-angle image having a first image definition, the first image definition being lower in resolution than an image definition of the wide-angle image that has been obtained;
   obtain a part of the wide-angle image as a narrow-angle image; and
   apply projection transformation to the narrow-angle image to generate a narrow-angle image having a projection different than a projection of the wide-angle image, the narrow-angle image having a second image definition which is higher in resolution than the resolution of the first image definition of the wide-angle image.

2. The image processing apparatus of claim 1,
   wherein the wide-angle image is an entirely captured image having been obtained by capturing the object.

3. The image processing apparatus of claim 1, further comprising:
an imager configured to capture the object to generate a spherical image as the captured image.

4. The image processing apparatus of claim 1, further comprising:
a memory that stores the wide-angle image and the narrow-angle image in association.

5. The image processing apparatus of claim 1,
wherein the circuitry is further configured to transmit the wide-angle image and the narrow-angle image in association to a communication terminal for display at the communication terminal.

6. The image processing apparatus of claim 5,
wherein the circuitry determines a data size of the wide-angle image and the narrow-angle image according to an image size for transmission according to instruction data transmitted from the communication terminal.

7. The image processing apparatus of claim 1,
wherein the wide-angle image is generated in equirectangular projection, and
the narrow-angle image is generated in perspective projection.

8. An image capturing system comprising:
the image processing apparatus of claim 5; and
the communication terminal configured to receive the wide-angle image and the narrow-angle image from the image processing apparatus, and control a display to display the narrow-angle image being superimposed on the wide-angle image.

9. The image capturing system of claim 8,
wherein the communication terminal receives a user operation for specifying an area of the wide-angle image, and transmits instruction data indicating the specified area of the wide-angle image to the image processing apparatus,
wherein the circuitry of the image processing apparatus is configured to
in response to reception of the instruction data indicating the specified area of the wide-angle image from the communication terminal,
determine whether the specified area has a size less than a threshold size, and
based on a determination indicating that the specified area does not have a size less than a threshold size, obtain a part of the wide-angle image having at least the threshold size as the narrow-angle image.

10. The image capturing system of claim 8, wherein the communication terminal includes any one of a smart phone, smart watch, personal computer, and car navigation system.

11. The image capturing system of claim 8, further comprising:
an image capturer configured to capture the image of the object to generate a spherical image as the captured image, and transmit the captured image to the image processing apparatus.

12. An image processing method comprising:
obtaining a wide-angle image, the wide-angle image being a part of or entire captured image of an object;
converting the wide-angle image into a wide-angle image having a first image definition, the first image definition being lower in resolution than an image definition of the wide-angle image that has been obtained;
obtaining a part of the wide-angle image as a narrow-angle image; and
applying projection transformation to the narrow-angle image to generate a narrow-angle image having a projection different than a projection of the wide-angle image, the narrow-angle image having a second image definition which is higher in resolution than the resolution of the first image definition of the wide-angle image.

13. A non-transitory recording medium which, when executed by one or more processors, cause the processors to perform an image processing method comprising:
obtaining a wide-angle image, the wide-angle image being a part of or entire captured image of an object;
converting the wide-angle image into a wide-angle image having a first image definition, the first image definition being lower in resolution than an image definition of the wide-angle image that has been obtained;
obtaining a part of the wide-angle image as a narrow-angle image; and
applying projection transformation to the narrow-angle image to generate a narrow-angle image having a projection different than a projection of the wide-angle image, the narrow-angle image having a second image definition which is higher in resolution than the resolution of the first image definition of the wide-angle image.

14. The image processing method of claim 12,
wherein the wide-angle image is an entirely captured image having been obtained by capturing the object.

15. The non-transitory recording medium of claim 13,
wherein the wide-angle image is an entirely captured image having been obtained by capturing the object.

* * * * *